US012671542B2

(12) United States Patent　(10) Patent No.:　US 12,671,542 B2
Wang et al.　(45) Date of Patent:　Jun. 30, 2026

(54) SOUNDING REFERENCE SIGNAL CONFIGURATION FOR ANTENNA SWITCHING AND CARRIER SWITCHING

(71) Applicant: Intel Corporation, Santa Clara, CA (US)

(72) Inventors: Guotong Wang, Beijing (CN); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 185 days.

(21) Appl. No.: 18/549,325

(22) PCT Filed: Mar. 15, 2022

(86) PCT No.: PCT/US2022/020346
§ 371 (c)(1),
(2) Date: Sep. 6, 2023

(87) PCT Pub. No.: WO2022/197678
PCT Pub. Date: Sep. 22, 2022

(65) Prior Publication Data
US 2024/0187176 A1　Jun. 6, 2024

(30) Foreign Application Priority Data

Mar. 16, 2021　(WO) ................ PCT/CN2021/081066
Apr. 5, 2021　(WO) ................ PCT/CN2021/085522
(Continued)

(51) Int. Cl.
*H04L 5/00*　(2006.01)
*H04W 72/23*　(2023.01)
*H04W 52/32*　(2009.01)

(52) U.S. Cl.
CPC ............ *H04L 5/005* (2013.01); *H04L 5/0035* (2013.01); *H04W 72/23* (2023.01); *H04W 52/325* (2013.01)

(58) Field of Classification Search
None
See application file for complete search history.

(56) References Cited

U.S. PATENT DOCUMENTS

| | | | |
|---|---|---|---|
| 12,192,910 B2 * | 1/2025 | Kang .................. | H04W 52/367 |
| 2019/0274155 A1 * | 9/2019 | Bhattad ................ | H04L 5/0073 |

(Continued)

FOREIGN PATENT DOCUMENTS

| | | |
|---|---|---|
| JP | 2020136759 | 8/2020 |
| WO | 2019195528 | 10/2019 |

(Continued)

OTHER PUBLICATIONS

International Patent Office—International Search Report and Written Opinion mailed Jun. 17, 2022 from International Patent Application No. PCT/US2022/020346, 11 pages.

(Continued)

*Primary Examiner* — Bob A Phunkulh
(74) *Attorney, Agent, or Firm* — Schwegman Lundberg & Woessner, P.A.

(57) ABSTRACT

Systems, apparatuses, methods, and computer-readable media are provided for SRS configuration for antenna switching and/or carrier switching. The described techniques may be used in multi-TRP and/or single TRP communication. Also described are techniques for beam configuration for SRS with antenna switching. For example, embodiments provide techniques for beam configuration/update for SRS antenna switching considering the beam (Continued)

change signaling received during the antenna switching procedure. Other embodiments may be described and claimed.

12 Claims, 20 Drawing Sheets

(30) Foreign Application Priority Data

| | | |
|---|---|---|
| Apr. 6, 2021 | (WO) | PCT/CN2021/085573 |
| Apr. 19, 2021 | (WO) | PCT/CN2021/088007 |
| Oct. 13, 2021 | (WO) | PCT/CN2021/123518 |
| Oct. 18, 2021 | (WO) | PCT/CN2021/124305 |

(56) References Cited

U.S. PATENT DOCUMENTS

| | | | | |
|---|---|---|---|---|
| 2021/0144720 | A1* | 5/2021 | Xu | H04L 5/0053 |
| 2021/0242991 | A1* | 8/2021 | Manolakos | H04L 5/0094 |
| 2021/0306123 | A1* | 9/2021 | Gao | H04L 5/0048 |
| 2022/0039028 | A1* | 2/2022 | Wernersson | H04B 7/0695 |
| 2022/0116178 | A1* | 4/2022 | Go | H04L 1/0013 |
| 2022/0116979 | A1* | 4/2022 | Park | H04L 5/0053 |
| 2022/0353032 | A1* | 11/2022 | Abdelghaffar | H04L 5/0051 |
| 2022/0368405 | A1* | 11/2022 | Shi | H04B 7/0814 |
| 2023/0050730 | A1* | 2/2023 | Wang | H04L 5/0091 |
| 2023/0054488 | A1* | 2/2023 | Manolakos | H04L 5/0035 |
| 2023/0084239 | A1* | 3/2023 | Cha | H04W 52/245 |
| | | | | 455/522 |
| 2023/0118905 | A1* | 4/2023 | Go | H04L 5/0044 |
| | | | | 370/329 |
| 2023/0179370 | A1* | 6/2023 | Wang | H04L 5/0094 |
| | | | | 370/329 |
| 2023/0275629 | A1* | 8/2023 | Wang | H04W 24/02 |
| | | | | 375/262 |
| 2023/0344590 | A1* | 10/2023 | Manolakos | H04L 5/0051 |
| 2023/0353297 | A1* | 11/2023 | Abdelghaffar | H04B 7/0456 |
| 2024/0114504 | A1* | 4/2024 | Gao | H04L 5/0094 |

FOREIGN PATENT DOCUMENTS

| | | |
|---|---|---|
| WO | 2020165413 | 8/2020 |
| WO | 2021/030674 A1 | 2/2021 |
| WO | 2022197678 | 9/2022 |

OTHER PUBLICATIONS

TCL, "Enhancements on Multi-Beam Operation," 3GPP TSG RAN WG1 Meeting #104-e, R1-2101644, Agenda Item: 8.1.1, Jan. 25-Feb. 5, 2021, e-Meeting, 6 pages.

Qualcomm Incorporated, "[102-e-LS-A15-04] Discussion on NR SRS carrier switching," 3GPP TSG RAN WG1 Meeting #102-e, R1-2007044, Agenda item: 5, Aug. 17-28, 2020, e-Meeting, 9 pages.

Mediatek Inc., "Enhancements on multi-beam operations," 3GPP TSG RAN WG1 Meeting #96bis, R1-1904476, Agenda Item: 7.2.8.3, Apr. 8-12, 2019, Xi'an, China, 12 pages.

Intel Corporation, "Discussion on SRS enhancements," 3GPP TSG RAN WG1 Meeting #103-e, R1-2008982, Agenda item: 8.1.3, Oct. 26-Nov. 13, 2020, e-Meeting, 15 pages.

"International Application Serial No. PCT US2022 020346, International Preliminary Report on Patentability mailed Sep. 28, 2023", 7 pgs.

"Japanese Application Serial No. 2023-555699, Notification of Reasons for Refusal mailed Jan. 6, 2026", 11 pgs.

"Japanese Application Serial No. 2023-555699, Response filed Mar. 30, 2026 to Notification of Reasons for Refusal mailed Jan. 6, 2026", w English Claims, 15 pgs.

* cited by examiner

```
SRS-ResourceSet  ::=        SEQUENCE {
  srs-ResourceSetId         SRS-ResourceSetId,
  srs-ResourceIdList        SEQUENCE (SIZE (1..maxNrofSRS-ResourcePerSet))  OF SRS-ResourceId    OPTIONAL, -- Cond Setup
  resourceType              CHOICE {
    aperiodic               SEQUENCE {
      aperiodicSRS-ResourceTrigger    INTEGER  (1..maxNrofSRS-TriggerStates-1),
      csi-RS                NZP-CSI-RS-ResourceId                            OPTIONAL, -- Cond NonCodebook
      slotOffset            INTEGER  (1..32)                                 OPTIONAL, -- Need S
      ...,
      [[
      aperiodicSRS-ResourceTriggerList    SEQUENCE  (SIZE (1..maxNrofSRS-TriggerStates-2))
                                              OF INTEGER  (1..maxNrofSRS-TriggerStates-1)   OPTIONAL -- Need M
      ]]
    },
    semi-persistent         SEQUENCE {
      associatedCSI-RS      NZP-CSI-RS-ResourceId                            OPTIONAL, -- Cond NonCodebook
      ...
    },
    periodic                SEQUENCE {
      associatedCSI-RS      NZP-CSI-RS-ResourceId                            OPTIONAL, -- Cond NonCodebook
      ...
    }
  },
  usage                     ENUMERATED {beamManagement, codebook, nonCodebook, antennaSwitching},
  alpha                     Alpha                                           OPTIONAL, -- Need S
  p0                        INTEGER  (-202..24)                             OPTIONAL, -- Cond Setup
  pathlossReferenceRS       PathlossReferenceRS-Config                      OPTIONAL, -- Need M
  srs-PowerControlAdjustmentStates    ENUMERATED  { sameAsFci2, separateClosedLoop}   OPTIONAL, -- Need S
  ...,
  [[
  pathlossReferenceRSList-r16    SetupRelease  { PathlossReferenceRSList-r16}    OPTIONAL  -- Need M
  ]]
}
```

DL Slot

UL Slot

SRS resource #0

SRS resource #1

Periodic SRS resource set #A

Case A: 2T4R antenna switching in single TRP

Case B: 2T4R antenna switching in multi-TRP

| | Oct 1 | Oct 2 | Oct 3 | Oct 4 | Oct 5 | ... | Oct N-1 | Oct N |
|---|---|---|---|---|---|---|---|---|
| R | Serving Cell ID | SRS Resource Set ID 1 | Pathloss Reference RS ID 1 | SRS Resource Set ID 2 | Pathloss Reference RS ID 2 | ... | SRS Resource Set ID M | Pathloss Reference RS ID M |
| R | | R | | R | | | R | |
| R | | R | | R | | | R | |
| R | BWPID | R | | R | | | R | |
| R | | R | | R | | | R | |
| R | | R | | R | | | R | |

Figure 9

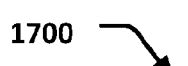

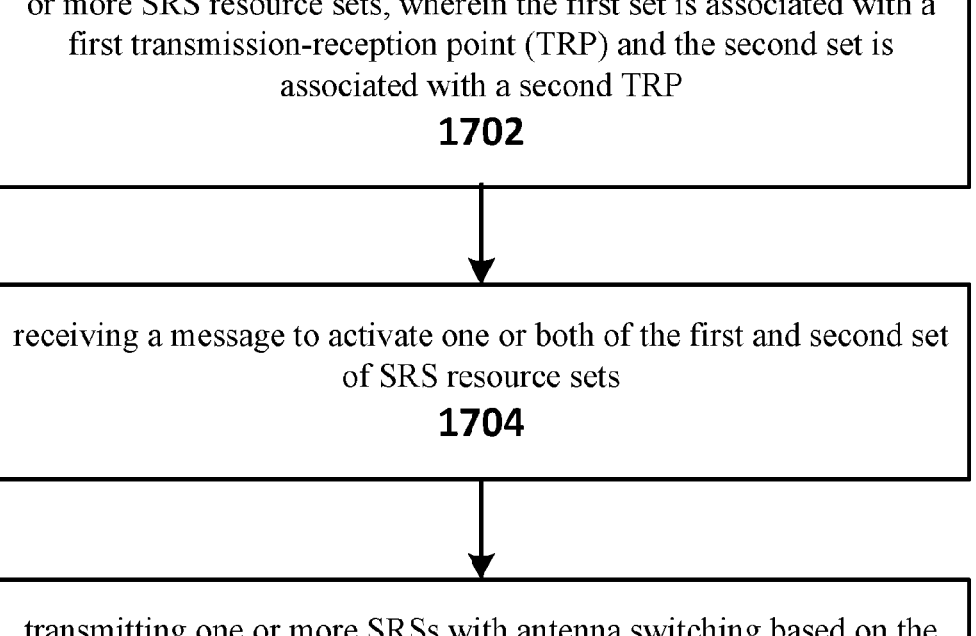

receiving configuration information for a first set of one or more
sounding reference signal (SRS) resource sets and a second set of one
or more SRS resource sets, wherein the first set is associated with a
first transmission-reception point (TRP) and the second set is
associated with a second TRP
1702 receiving a message to activate one or both of the first and second set
of SRS resource sets
1704 transmitting one or more SRSs with antenna switching based on the
activated SRS resource sets
1706

Figure 17

1800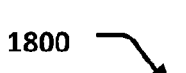

encoding, for transmission to a user equipment (UE), configuration information for a first set of one or more sounding reference signal (SRS) resource sets and a second set of one or more SRS resource sets, wherein the first set is associated with a first transmission-reception point (TRP) and the second set is associated with a second TRP

1802 encoding a message for transmission to the UE to activate one or both of the first and second set of SRS resource sets for antenna switching

1900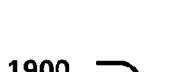

encoding, for transmission to a user equipment (UE), configuration information for a plurality of sounding reference signal (SRS) resource sets associated with a transmission-reception point (TRP) and configured for antenna switching, wherein all SRS resources of the plurality of SRS resource sets have a same transmission configuration indicator (TCI) state

1902 receiving, from the UE, one or more SRSs with antenna switching based on the configuration information

SOUNDING REFERENCE SIGNAL CONFIGURATION FOR ANTENNA SWITCHING AND CARRIER SWITCHING

CROSS REFERENCE TO RELATED APPLICATION

The present application is a national phase entry under 35 U.S.C. § 371 of International Application No. PCT/US2022/020346, filed Mar. 15, 2022, entitled "SOUNDING REFERENCE SIGNAL CONFIGURATION FOR ANTENNA SWITCHING AND CARRIER SWITCHING," which claims priority to International Patent Application No. PCT/CN2021/081066, which was filed Mar. 16, 2021; International Patent Application No. PCT/CN2021/085522, which was filed Apr. 5, 2021; International Patent Application No. PCT/CN2021/085573, which was filed Apr. 6, 2021; International Patent Application No. PCT/CN2021/088007, which was filed Apr. 19, 2021; International Patent Application No. PCT/CN2021/123518, which was filed Oct. 13, 2021; and International Patent Application No. PCT/CN2021/124305, which was filed Oct. 18, 2021, the entire disclosures of which are hereby incorporated by reference.

FIELD

Various embodiments generally may relate to the field of wireless communications. For example, some embodiments may relate to sounding reference signal configuration for antenna switching and/or carrier switching.

BACKGROUND

In the 3GPP New Radio (NR) Release (Rel)-15 specification, different types of sounding reference signal (SRS) resource sets are supported. The SRS resource set is configured with a parameter of 'usage', which can be set to 'beamManagement', 'codebook', 'nonCodebook' or 'antennaSwitching'. The SRS resource set configured for 'beamManagement' is used for beam acquisition and uplink beam indication using SRS. The SRS resource set configured for 'codebook' and 'nonCodebook' is used to determine the UL precoding with explicit indication by transmission precoding matrix index (TPMI) or implicit indication by SRS resource index (SRI). Finally, the SRS resource set configured for 'antennaSwitching' is used to acquire downlink (DL) channel state information (CSI) using SRS measurements in the user equipment (UE) by leveraging reciprocity of the channel in time domain duplexing (TDD) systems. For SRS transmission, the time domain behavior may be periodic, semi-persistent or aperiodic. Currently the maximum number of SRS resource sets that can be configured to one UE is 16 (maxNrofSRS-ResourceSets INTEGER::=16).

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 illustrates an example of a radio resource control (RRC) message for SRS resource set configuration in accordance with various embodiments.

FIG. 3 illustrates an example of RRC re-configuration needed for SRS carrier switching in accordance with various embodiments.

FIG. 9 illustrates another example of enhanced MAC CE for SRS pathloss RS update, in accordance with various embodiments.

FIGS. 17, 18, and 19 depicts example procedures for practicing the various embodiments discussed herein.

DETAILED DESCRIPTION

Figure 2:
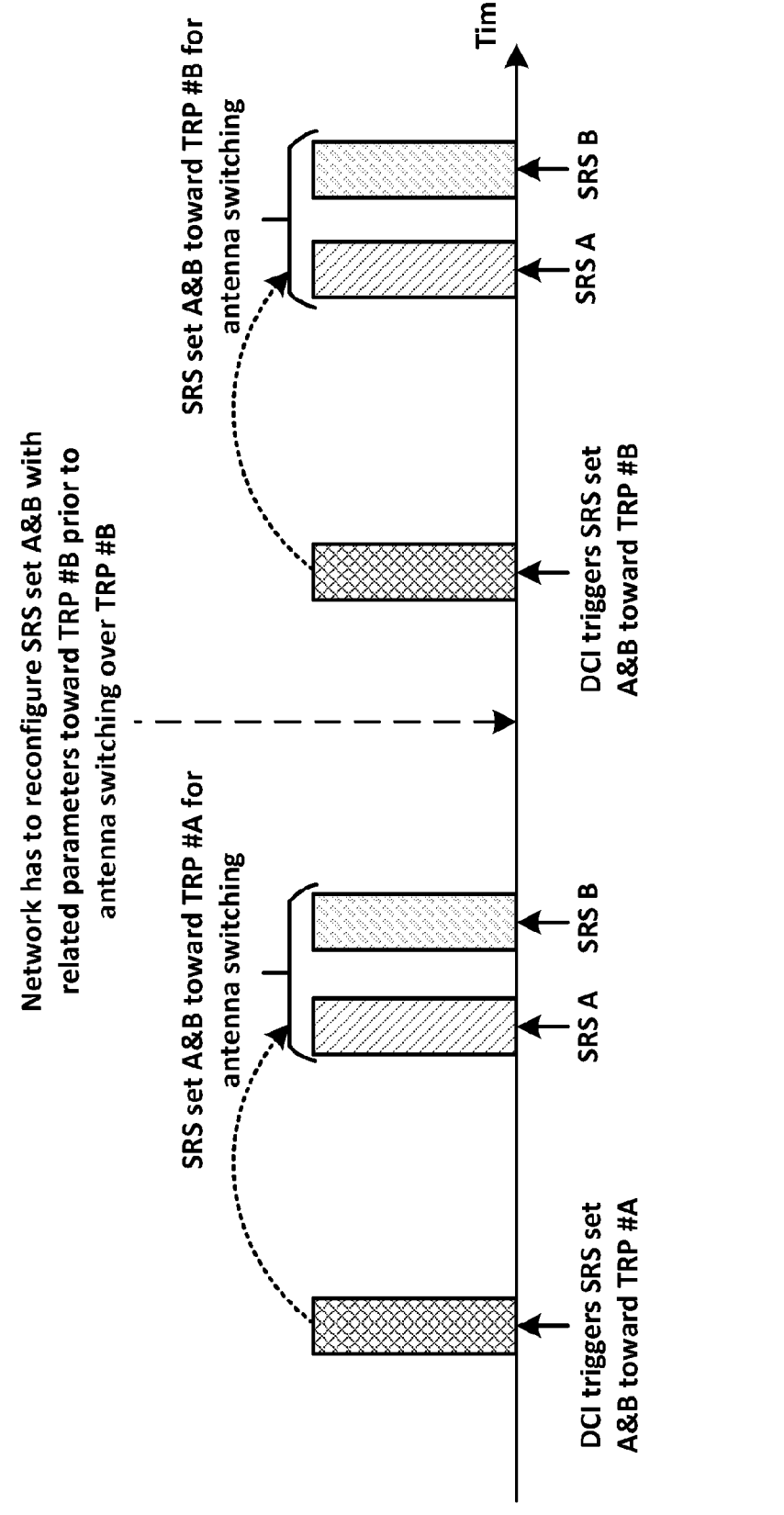
FIG. 2 illustrates an example of RRC re-configuration needed for antenna switching among transmission-reception points (TRPs) in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various embodiments herein provide techniques for SRS configuration for antenna switching and/or carrier switching.

For antenna switching, in Rel-15/Rel-16, it supports antenna configuration of xTyR with {x=1, 2, 4; y=1, 2, 4, and x<=y}. Table 1 shows the SRS resource set configuration for antenna switching in Rel-15/Rel-16.

TABLE 1

| | SRS resource set configuration for antenna switching in Rel-15/Rel-16 | | | |
| --- | --- | --- | --- | --- |
| xTyR | # of SRS resource sets | # of SRS resources per set | # of SRS ports per resource | Mapping with UE antenna port |
| 1T2R | Up to 2 SRS resource sets with different resourceType | 2 | 1 port | The SRS port of each resource associated with different UE antenna port |
| 2T4R | Up to 2 SRS resource sets with different resourceType | 2 | 2 ports | The SRS port pair of each resource associated with different UE antenna port |
| 1T4R | 0 or 1 SRS resource set configured as 'periodic'' or 'semi-persistent' | 4 | 1 port | The SRS port of each resource associated with different UE antenna port |
| | 0 or 2 SRS resource sets configured as 'aperiodic' | 2 + 2 or 1 + 3 | 1 port | The SRS port of each resource associated with different UE antenna port |
| 1T1R | Up to 2 SRS resource | 1 | 1 | |
| 2T2R | sets | | 2 | |
| 4T4R | | | 4 | |

Embodiments may be used in multi-TRP and/or single TRP communication. Some embodiments may additionally or alternatively provide techniques for beam configuration for SRS with antenna switching. For example, embodiments provide techniques for beam configuration/update for SRS antenna switching considering the beam change signaling received during the antenna switching procedure.

FIG. 1 shows the RRC configuration for SRS resource set. When SRS resource set is configured as 'aperiodic', the SRS resource set also includes configuration of trigger state(s) (aperiodicSRS-Resource Trigger, aperiodicSRS-Resource TriggerList). The triggering state(s) defines which DCI codepoint(s) triggers the corresponding SRS resource set transmission. In the RRC configuration for SRS resource set, there are parameters applied for power control, such as:

alpha, indicating the alpha value used for SRS power control, which is the pathloss compensation factor p0, indicating the p0 value for SRS power control, which is the target received SRS power pathlossReferenceRS, indicating the reference signal used for pathloss estimation srs-PowerControlAdjustmentState, indicating the SRS power control state, which is one of {same as the $1^{st}$ PUSCH power control state, same as the $2^{nd}$ PUSCH power control state, separate power control state}.

The SRS may also be used for carrier switching to perform sounding over some component carriers without PUSCH configured. For carrier switching, the usage of the SRS resource set is set to 'antennaSwitching', and the power control state is set to 'separateClosedLoop'. The SRS for carrier switching is triggered by DCI format 2_3.

The aperiodic SRS may be triggered via SRS Request field in DCI. SRS Request field may be carried by DCI format 0_1/0_2/1_1/1_2/2_3, wherein DCI format 0_1/0_2 is used for scheduling PUSCH, DCI format 1_1/1_2 is used for scheduling PDSCH and DCI format 2_3 is used to trigger aperiodic SRS for a group of UEs. In Rel-17, the aperiodic SRS may be also triggered by DCI format 0_1/0_2 without scheduling PUSCH.

In Rel-17, the antenna switching is extended with up to 8 Rx, e.g. xTyR with {x=1, 2, 4; y=1, 2, 4, 6, 8; x<=y}. Table 2 shows an example for the newly added antenna configuration (see 3GPP RAN1 #104-e meeting).

TABLE 2

| Aperiodic SRS resource set configuration for antenna switching in Rel-17 | | |
| --- | --- | --- |
| xTyR | Candidate maximum number of aperiodic SRS resource sets | # of SRS ports per resource |
| 1T6R | 4 | 1 port |
| 1T8R | 4 | 1 port |
| 2T6R | 3 | 2 ports |
| 2T8R | 4 | 2 ports |
| 4T8R | 2 | 4 ports |

Currently, the SRS antenna switching does not consider the multi-TRP operation and the SRS power control related parameters are semi-statically configured by RRC. The multiple SRS resource sets for antenna switching are configured with power control parameters with one TRP, e.g. TRP #A, if the network side would like to trigger antenna switching for DL CSI acquisition over another TRP (TRP #B), then RRC reconfiguration is needed to reconfigure the power control parameters of the SRS resource sets. This would lead to a lot of RRC reconfiguration signaling overhead. FIG. 2 shows an example of the issue.

Figure 3:
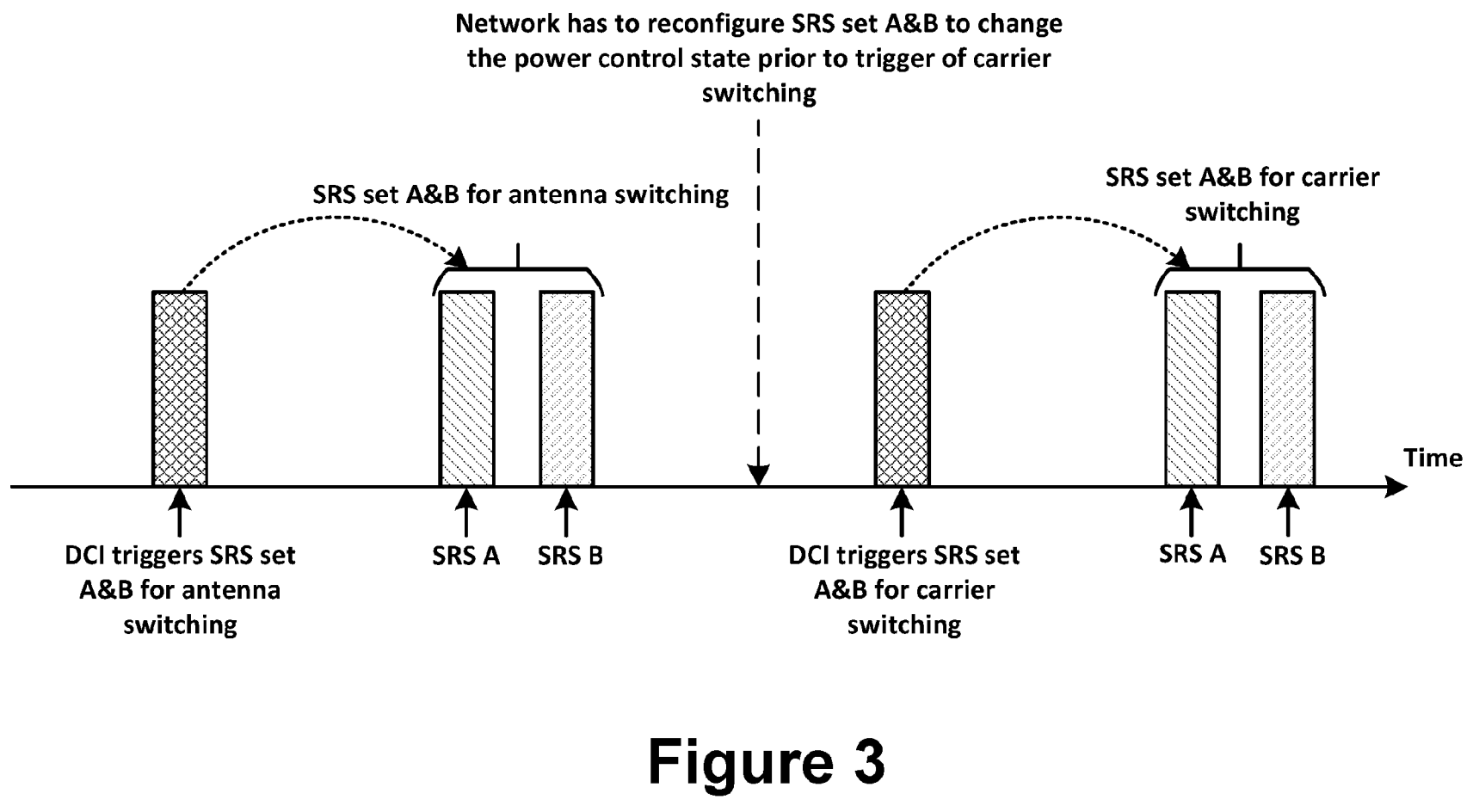

Additionally, in single TRP operation, the SRS carrier switching will use some SRS resource set with usage configured as 'antennaSwitching'. However, the SRS carrier switching triggered by DCI format 2_3 is expected to use separate power control state from PUSCH, e.g. 'separateCloseLoop'. It means that before triggering the SRS carrier switching, the gNB side needs to perform RRC reconfiguration to change the power control state setting for the SRS resource set, which leads to additional signaling overhead. FIG. 3 shows an example of the issue.

Accordingly, the current SRS resource configuration for antenna switching and carrier switching is not flexible and may lead to a lot of signaling overhead.

Among other things, embodiments of the present disclosure provide techniques for SRS resource configuration for antenna switching and carrier switching considering multi-TRP and single TRP operation.

Scenario A: SRS Configuration for Antenna Switching and Carrier Switching in Multi-TRP In an embodiment, for multi-TRP operation, the number of aperiodic SRS resource sets for antenna switching should be extended. If the number of aperiodic SRS resource sets for antenna switching in single TRP is M, then in multi-TRP operation of two TRPs, two groups of aperiodic SRS resource sets should be configured for antenna switching. Each group contains M aperiodic SRS resource sets, e.g. the total number of aperiodic SRS resource sets in multi-TRP is 2*M. In the first group, the power control parameters of the M aperiodic SRS resource sets are associated with the $1^{st}$ TRP. In the second group, the power control parameters of the M aperiodic SRS resource sets are associated with the $2^{nd}$ TRP. The power control parameters may include one or several or all of the following parameters:

SRS power control adjustment state, 'srs-PowerControl-AdjustmentState'

For example, the M aperiodic SRS resource sets in the $1^{st}$ group should be configured with the same as the $1^{st}$ PUSCH power control state. The M aperiodic SRS resource sets in the $2^{nd}$ group should be configured with the same as the $2^{nd}$ PUSCH power control state.

Pathloss reference signal, 'pathlossReferenceRS'

For example, the M aperiodic SRS resource sets in the $1^{st}$ group should be configured with pathloss RS associated with the $1^{st}$ TRP. The M aperiodic SRS resource sets in the $2^{nd}$ group should be configured with pathloss RS associated with the $2^{nd}$ TRP.

P0, 'p0'

Alpha, 'alpha'

Spatial relation, 'spatialRelationInfo'

For example, all the SRS resources in the M aperiodic SRS resource sets in the 1st group should be configured with spatial relation associated with the $1^{st}$ TRP. All the SRS resources in the M aperiodic SRS resource sets in the $2^{nd}$ group should be configured with spatial relation associated with the $2^{nd}$ TRP.

Figure 4:
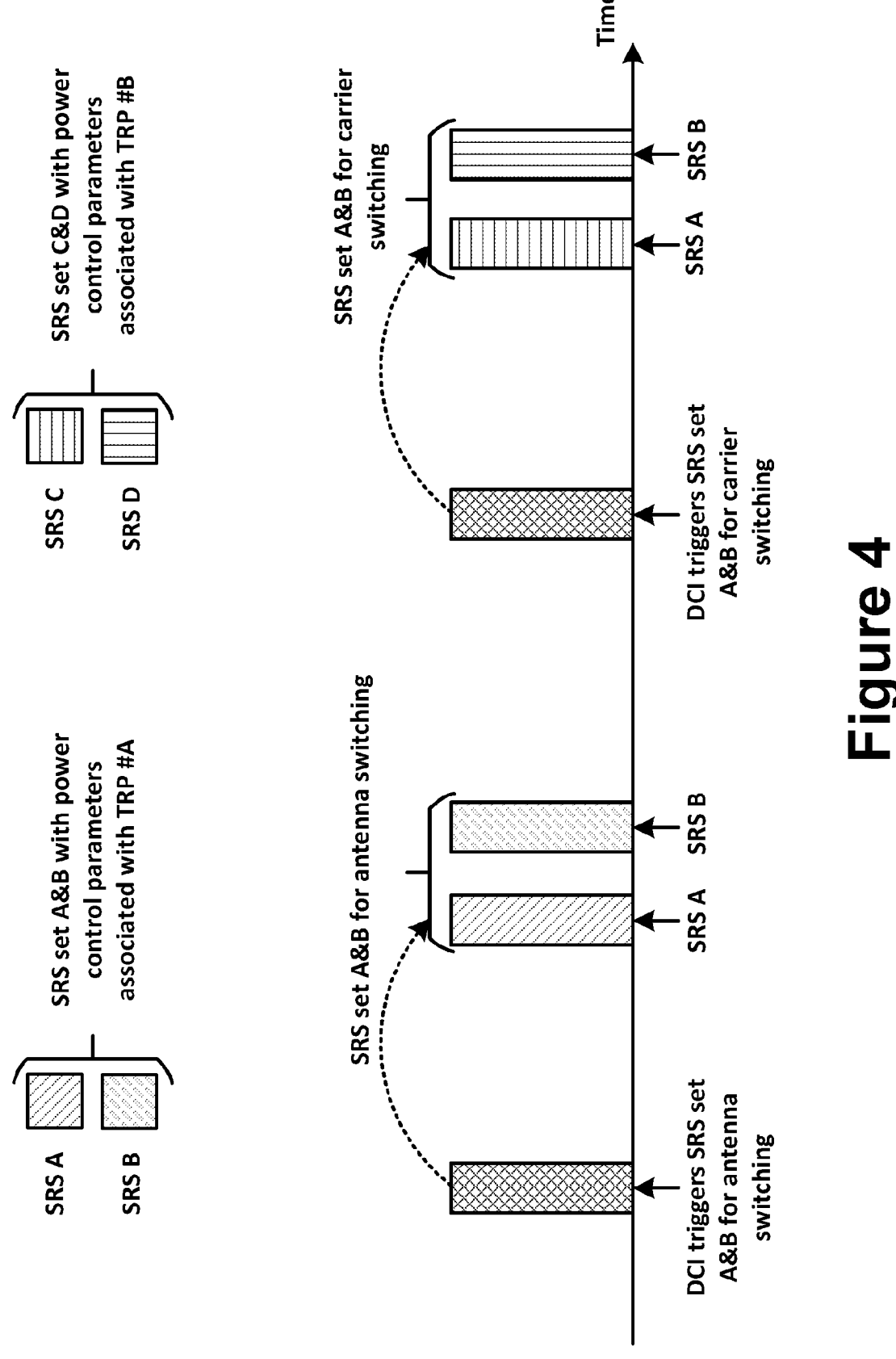
FIG. 4 illustrates an example of doubled SRS resource sets for antenna switching in multi-TRP operation, in accordance with various embodiments.

FIG. 4 shows an example of the operation.

In order to support dynamic switch between TRPs and dynamic switch between single TRP and multi-TRP, the different groups of aperiodic SRS resource sets may be configured with different trigger states. For example, the 1st group of aperiodic SRS resource set is configured with trigger state #1, and the second group of aperiodic SRS resource set may be configured with trigger state #2. In this way, different trigger state indicated by DCI may trigger antenna switching operation toward different TRP.

The different groups of aperiodic SRS resource sets may also be additionally configured with a same value of trigger state to trigger antenna switching operation toward both TRP.

In another example, the different groups of aperiodic SRS resource sets for xTyR may be configured with the same trigger state. And MAC-CE may be introduced to activate/deactivate one or several aperiodic SRS resource sets. Only those activated aperiodic SRS resource sets will be transmitted.

In another embodiment, for multi-TRP operation, the number of periodic/semi-persistent SRS resource sets for antenna switching should be extended. If the number of periodic/semi-persistent SRS resource sets for antenna switching in single TRP is N, then in multi-TRP operation of two TRPs, two groups of periodic/semi-persistent SRS resource sets should be configured for antenna switching. Each group contains N periodic/semi-persistent SRS resource sets, e.g. the total number of periodic/semi-persistent SRS resource sets in multi-TRP is 2*N. In the first group, the power control parameters of the N periodic/semi-persistent SRS resource sets are associated with the $1^{st}$ TRP. In the second group, the power control parameters of the N periodic/semi-persistent SRS resource sets are associated with the $2^{nd}$ TRP. Or it may re-use some un-used fields in the DCI, for example, some un-used fields if the SRS is triggered by DCI format 0_1/0_2 without scheduling PUSCH and with/without CSI Request. The power control parameters may include one or more (e.g., all) of the following parameters:

SRS power control adjustment state, 'srs-PowerControl-AdjustmentState'

For example, the N periodic/semi-persistent SRS resource sets in the $1^{st}$ group should be configured with the same as the $1^{st}$ PUSCH power control state. The N periodic/semi-persistent SRS resource sets in the $2^{nd}$ group should be configured with the same as the $2^{nd}$ PUSCH power control state.

Pathloss reference signal, 'pathlossReferenceRS'

For example, the N periodic/semi-persistent SRS resource sets in the $1^{st}$ group should be configured with pathloss RS associated with the $1^{st}$ TRP. The N periodic/semi-persistent SRS resource sets in the $2^{nd}$ group should be configured with pathloss RS associated with the $2^{nd}$ TRP.

P0, 'p0'

Alpha, 'alpha'

Spatial relation, 'spatialRelationInfo'

For example, all the SRS resources in the N periodic/semi-persistent SRS resource sets in the $1^{st}$ group should be configured with spatial relation associated with the $1^{st}$ TRP. All the SRS resources in the N periodic/semi-persistent SRS resource sets in the $2^{nd}$ group should be configured with spatial relation associated with the $2^{nd}$ TRP.

In another example, in order to support dynamic switch between TRP and dynamic switch between single TRP and multi-TRP, MAC-CE may be used to activate/deactivate one or several periodic/semi-persistent SRS resource sets. Only those activated periodic/semi-persistent SRS resource set can be transmitted.

In another embodiment, for a certain xTyR antenna switching configuration in multi-TRP, the number of periodic/semi-persistent SRS resources sets can be configured to be the same as single TRP. For example, only one periodic and/or only one semi-persistent SRS resource set is configured in multi-TRP case. The number of SRS resources within the periodic/semi-persistent SRS resource set in multi-TRP should be doubled as the number of SRS resources in single TRP. And the SRS resources within the periodic/semi-persistent SRS resource set may be transmitted toward different TRP.

Figure 5A:
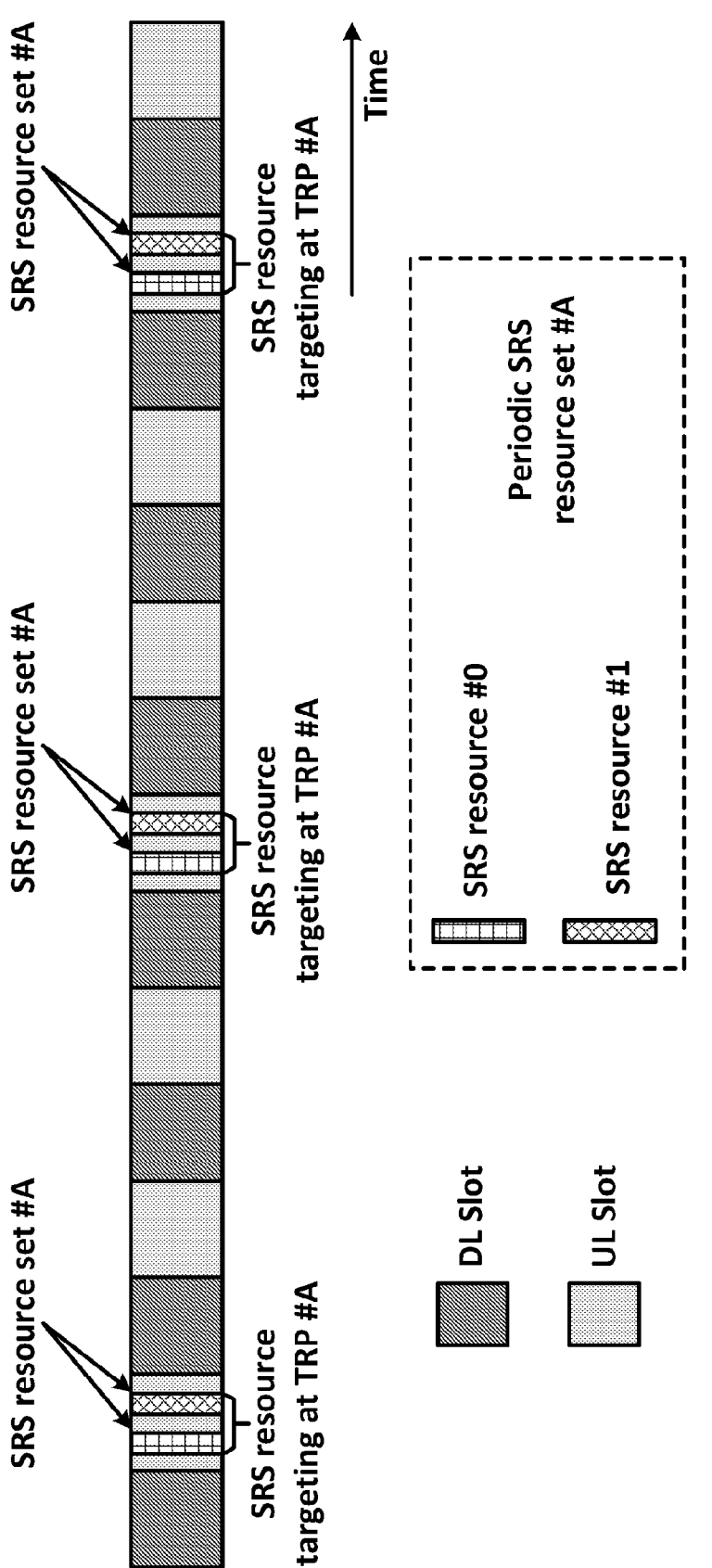
FIGS. 5A-B illustrates an example of periodic SRS configuration for antenna switching in multi-TRP operation, in accordance with various embodiments.
Figure 5B:
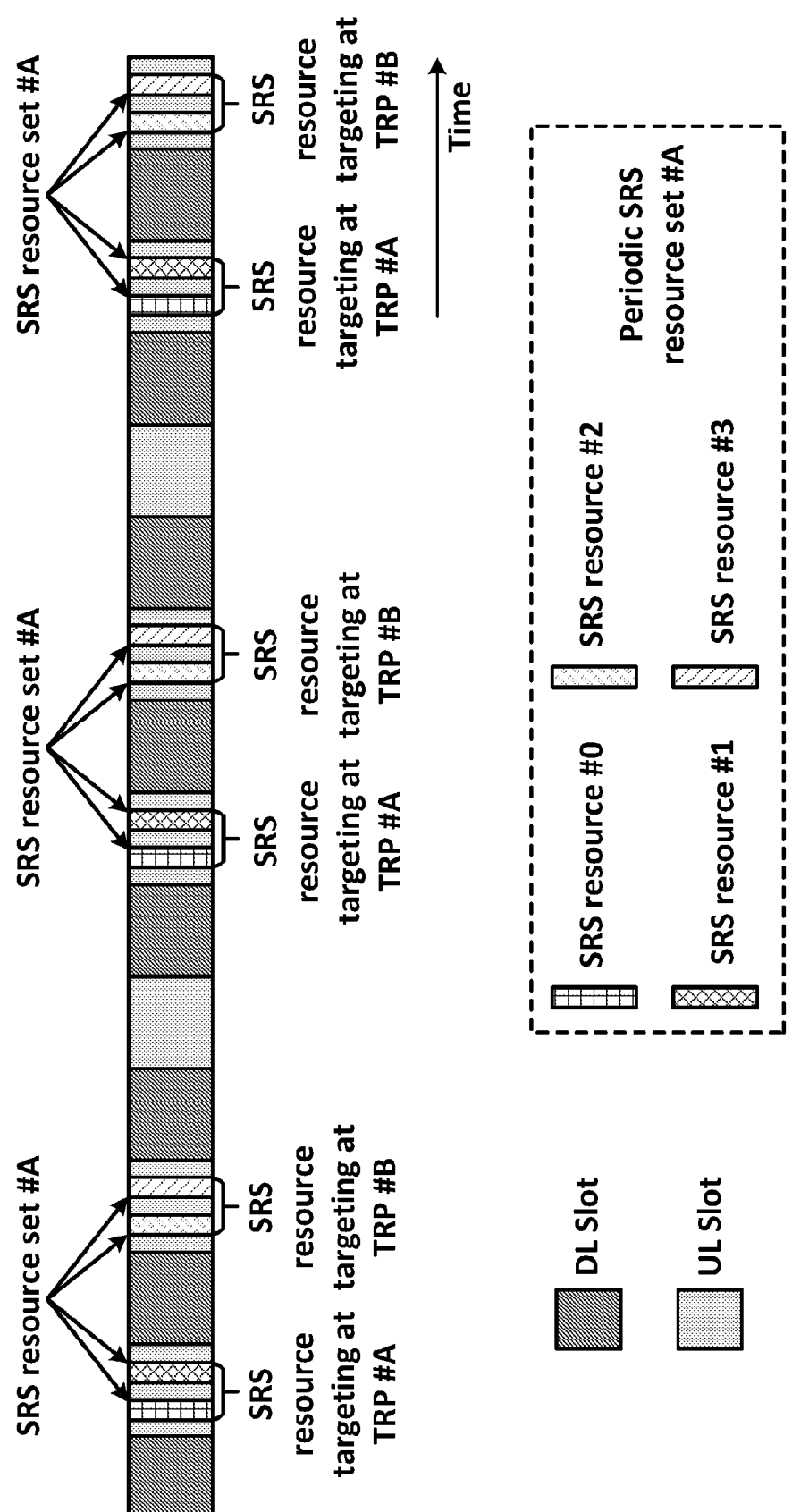

For example, for 2T4R, in single TRP case, only one periodic/semi-persistent SRS resource set is configured and there are two SRS resources included in the SRS resource set. In multi-TRP, only one periodic/semi-persistent SRS resource set is configured and there are four SRS resources included in the SRS resource set. FIGS. 5A-5B show an example of the operation. FIG. 5A shows an example of 2T4R antenna switching in single TRP. FIG. 5B shows an example of 2T4R antenna switching in multi-TRP.

Regarding the multiple SRS resources targeting at different TRPs within the periodic/semi-persistent SRS resource set, the transmission may be in sequential manner or in interlaced manner. For example, there are four SRS resources, #1 to #4, wherein SRS resource #1 and #2 are targeting at TRP #A, and SRS resource #3 and #4 are targeting at TRP #B. In sequential manner, the transmission sequence would be SRS #1, #2 and then #3, #4. In interlaced manner, the transmission sequence would be SRS #1, #3 and then #2, #4. Among the SRS resources toward different TRPs, there should be guard period for the UE to perform antenna switching/beam switching/panel switching.

With multiple SRS resources targeting at different TRPs within the same periodic/semi-persistent SRS resource set, the SRS resource should be configured with TRP specific parameters, including one or several or all the following parameters (these parameters will be configured at SRS resource level):

SRS power control adjustment state, or the SRS closed loop power control index

Pathloss reference signal

Spatial relation

P0 value alpha value

MAC-CE may be used to update the parameters above for one or multiple SRS resources in the SRS resource set.

Alternatively, one of or several of or all the above parameters may be defined as a parameter set by RRC (alternatively, the SRS power control adjustment state, P0, and alpha may be added into the pathloss reference signal IE or the spatial relation IE) at SRS resource level.

The RRC may configure a list of the parameter set to the SRS resource, e.g. multiple parameter sets. The MAC-CE may indicate one parameter set (by the parameter set ID) to be applied for the SRS. Alternatively, the parameter set may be implicitly indicated by the Pathloss Reference Signal ID or the Spatial Relation ID.

In another example, to enable dynamic switch between single TRP and multi-TRP operation, MAC-CE may be used to activate/deactivate some SRS resources in the periodic/semi-persistent SRS sets. Only those activated SRS resources will be transmitted. For example, there are four SRS resources in the periodic SRS resource set, #1 to #4, wherein SRS resource #1 and #2 are targeting at TRP #A, and SRS resource #3 and #4 are targeting at TRP #B. The MAC-CE may deactivate SRS resource #3 and #4. Then only SRS #1 and #2 are periodically transmitted, e.g. the antenna switching is performed only with TRP #A.

In another example, if the UE supports Rel-17 joint DL/UL TCI state or Rel-17 separate DL/UL TCI state, the TCI state may be associated with one or more (e.g., all) of the following parameters for SRS:

SRS power control adjustment state, or the SRS closed loop power control index

Pathloss reference signal

P0 value alpha value

When gNB indicates one or two TCI states for the UE, the related parameters may be applied for the SRS transmission towards at different TRP. The mapping between the TCI state and the corresponding SRS resource may be implicitly via the SRS power control adjustment state. For example, if the TCI state is associated with the 1$^{st}$ SRS power control adjustment state (or the first TRP), then the TCI state is applied for the SRS resources with the 1$^{st}$ SRS power control adjustment state which is configured by RRC or updated by MAC-CE.

Note: the MAC-CE/TCI state in this embodiment may also be applied to the case that multiple SRS periodic/semi-persistent SRS resource sets are configured in multi-TRP (doubled periodic/semi-persistent SRS resource sets as single TRP).

In another embodiment, for a certain xTyR antenna switching configuration in multi-TRP, the number of periodic/semi-persistent SRS resources sets can be configured to be the same as single TRP. For example, only one periodic and/or only one semi-persistent SRS resource set is configured in multi-TRP case. The number of SRS resources within the periodic/semi-persistent SRS resource set in multi-TRP is the same as the number of SRS resources in single TRP. And the SRS resources within the periodic/semi-persistent SRS resource set are transmitted toward the same TRP. The TRP specific parameters for SRS may be reconfigured/updated by RRC/MAC-CE/DCI.

In another embodiment, for a certain xTyR antenna switching configuration in multi-TRP, if the UE supports Rel-17 joint DL/UL TCI state or Rel-17 separate DL/UL TCI state, then the same number of periodic/semi-persistent SRS resource set may be configured as single TRP, wherein the number of SRS resources within the set is doubled and may be transmitted to different TRP. Otherwise the number of periodic/semi-persistent SRS resource sets may be doubled as single TRP, while the number of SRS resources within the set is the same as single TRP.

In another embodiment, MAC-CE may be used to update the SRS usage. For example, the SRS resource set is configured with antennaSwitching, MAC-CE may update its usage to be codebook. This embodiment may be applied to one or several or all the SRS usages (codebook, non-codebook, antennaSwitching, and beamManagement) and may be applied to one or more (e.g., all) of the SRS types (e.g., periodic, semi-persistent, and aperiodic).

In another embodiment, for multi-TRP operation, the maximum number of SRS resource sets that can be configured to one UE may be extended, for example to 32 or 64 (maxNrofSRS-ResourceSets INTEGER::=32 or maxN-rofSRS-ResourceSets INTEGER::=64). The number of trigger states for aperiodic SRS and the field length for SRS Request in DCI may also be extended to support flexible triggering.

In another embodiment, for multi-TRP operation, the number of aperiodic SRS resource sets for antenna switching may be maintained the same as single TRP operation. The power control parameters for the aperiodic SRS resource sets may be changed by the triggering DCI, e.g. the TRP specific power control parameters may be dynamically indicated by DCI triggering aperiodic SRS. A list of SRS power control parameter sets may be configured by RRC, and the DCI triggering aperiodic SRS may indicate which set will be applied for the triggered SRS. A new field should be added to the DCI that can trigger aperiodic SRS. Or it may re-use some un-used fields in the DCI, for example, some un-used fields if the SRS is triggered by DCI format 0_1/0_2 without scheduling PUSCH and with/without CSI Request. The power control parameters may include one or more (e.g., all) of the following parameters:

SRS power control adjustment state, 'srs-PowerControl-AdjustmentState'

Pathloss reference signal, 'pathlossReferenceRS'

P0, 'p0'

Alpha, 'alpha'

Spatial relation, 'spatialRelationInfo'

In an example, RRC may configure the following power control parameter sets for SRS (only SRS power control state and pathloss RS are included as example, more or less parameters may be included).

```
SRSPowerControlTRP1 ::= SEQUENCE {
srsPowerControlState              ENUMERATED { i0 }
srsPathlossRS                     PathlossReferenceRS-Config
}
SRSPowerControlTRP2 ::= SEQUENCE {
srsPowerControlState              ENUMERATED { i1 }
srsPathlossRS                     PathlossReferenceRS-Config
}
```

In another example, RRC may configure the following list for SRS (only SRS power control state and pathloss RS are included as example, more or less parameters may be included).

```
SRSPowerControlList-r17           SEQUENCE
(SIZE(1...maxNrofSRSPowerControl)) OF SRSPowerControl-Config
SRSPowerControl-Config ::= SEQUENCE {
srsPowerControlState              ENUMERATED {sameAsFci1,
sameAsFci2, separateClosedLoop }
srsPathlossRS                     PathlossReferenceRS-Config
}
```

If considering two separate power control states for SRS triggered by DCI format 2_3 in multi-TRP, the RRC configuration may be:

```
SRSPowerControlList-r17           SEQUENCE
(SIZE(1...maxNrofSRSPowerControl)) OF SRSPowerControl-Config
SRSPowerControl-Config ::= SEQUENCE {
srsPowerControlState              ENUMERATED {sameAsFci1,
sameAsFci2, separateClosedLoop1, separateClosedLoop2 }
srsPathlossRS                     PathlossReferenceRS-Config
}
```

Figure 6:
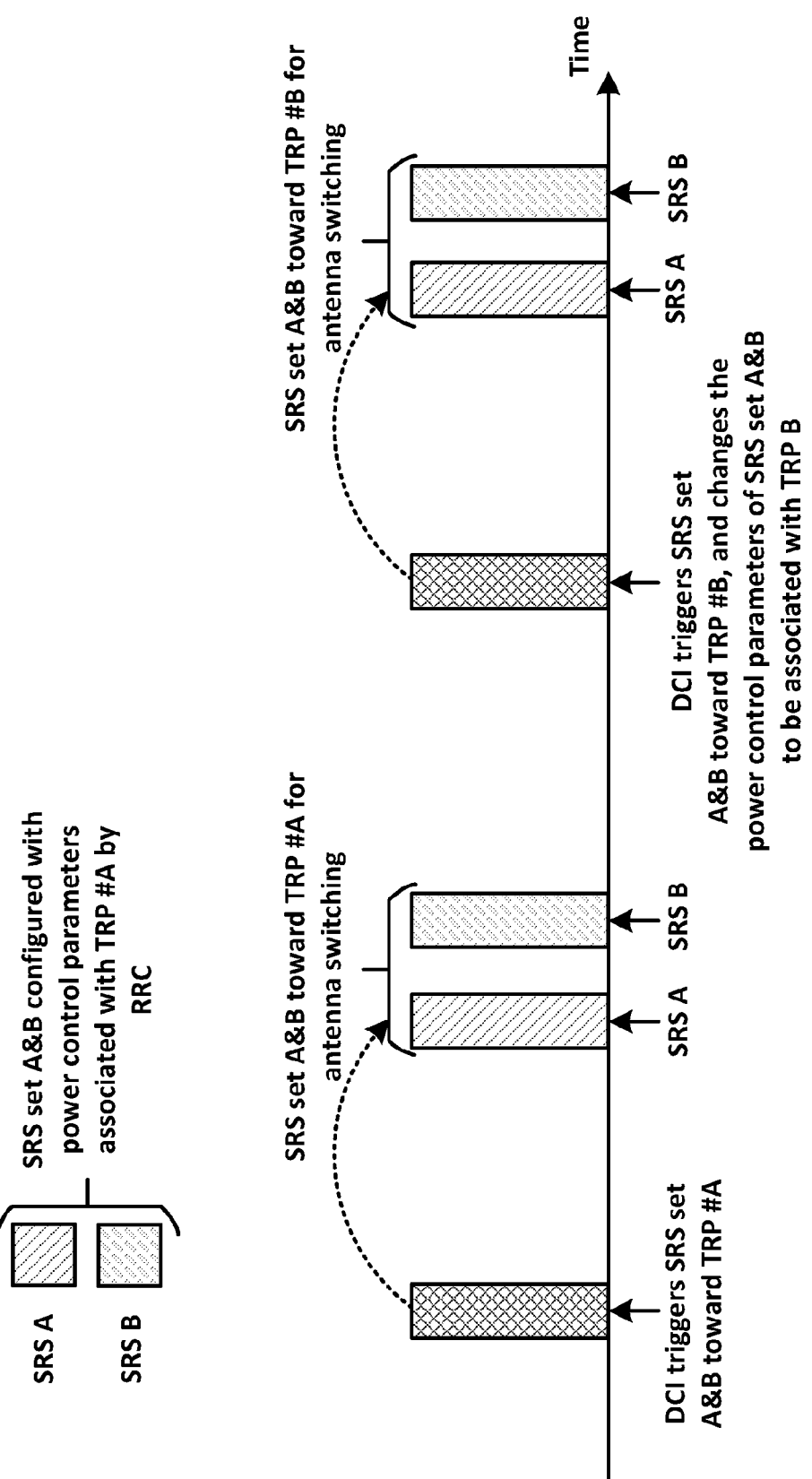
FIG. 6 illustrates an example of downlink control information (DCI)-indicated power control parameters for antenna switching in multi-TRP operation, in accordance with various embodiments.

In DCI triggering aperiodic SRS, a new field, e.g. 'SRS Power Control Parameter Set' may be included. The codepoint of this field may indicate which power control parameter set will be applied for the triggered SRS. FIG. 6 shows an example of the operation.

In another embodiment, for multi-TRP operation, the number of aperiodic SRS resource sets for antenna switching may be maintained the same as single TRP operation. The TRP specific power control parameters for the aperiodic SRS resource set(s) may be changed by MAC-CE. The power control parameters may include one or more (e.g., all) of the following parameters:

SRS power control adjustment state, 'srs-PowerControl-AdjustmentState'
Pathloss reference signal, 'pathlossReferenceRS'
P0, 'p0'
Alpha, 'alpha'
Spatial relation, 'spatialRelationInfo'

In another example, a list of SRS power control parameter sets may be configured by RRC, and the MAC-CE may indicate which set will be applied for the SRS resource set(s).

In another embodiment, for multi-TRP operation, the number of aperiodic SRS resource sets for antenna switching may be maintained the same as single TRP operation. The number of aperiodic SRS resources within one SRS resource set may be doubled as single TRP. MAC-CE may be used to activate/deactivate the SRS resources toward one specific TRP.

In another embodiment, for FR1 (frequency range 1), the same number of aperiodic/periodic/semi-persistent SRS resource sets as single TRP may be maintained for multi-TRP operation since there is no UE side beamforming. For example, the SRS resource sets are configured with power control parameters associated with TRP #A. If the network would like to perform antenna switching over TRP #B, then the power of the SRS may be boosted, (for example, SRS is transmitted with the maximum power), and TRP B can also receive the SRS for antenna switching.

In another embodiment, for antenna switching in multi-TRP, for a UE with xTyR ($x<=y$), the antenna switching operation performed by different TRP may be the same or different, for example, TRP #1 can perform antenna switching for $x_1 Ty_1 R$, TRP #2 can perform antenna switching for $x_2 Ty_2 R$, where:

$x_1 = x_2$ or $x_1 \sim = x_2$
$y_1 = y_2$ or $y_1 \sim = y_2$
$x_1 <= x$, $x_2 <= x$, $y_1 <= y$, $y_2 <= y$.

In an example, for UE capable of 2T8R, TRP #1 may perform antenna switching of 2T8R, and TRP #2 may perform antenna switching of 2T4R.

In another embodiment, for antenna switching in multi-TRP, the SRS resource set configuration depends on the antenna switching for each TRP. For example, TRP #1 performs antenna switching for $x_1 Ty_1 R$ which requires $M_1$ SRS resource sets, TRP #2 performs antenna switching for $x_2 Ty_2 R$ which requires $M_2$ SRS resource sets, then the number of SRS resource sets configured to the UE would be $M_1 + M_2$.

In another embodiment, for antenna switching in multi-TRP, the SRS resource set configuration depends on the UE capability. For example, the UE is capable of xTyR which requires N SRS resource sets. Then the UE will be configured two groups of SRS resource sets and each group contains N SRS resource sets, e.g. totally the UF will be configured with 2*N SRS resource sets. If one TRP would like to trigger antenna switching of x'Ty'R ($x'=x$, $y'<=y$) which requires K resource sets ($k<=N$), then the network side may trigger a subset of one group of SRS resource set, e.g. a subset of K SRS resource sets. The configuration may be achieved by configure additional trigger states. For example, the N resource sets are configured with trigger state #U, and the subset of K SRS resource sets are configured with additional trigger state of #W. When the TRP would like to perform antenna switching of xTyR, it will send DCI with trigger state of #U. When the TRP would like to perform antenna switching of x'Ty'R, it will send DCI with trigger state of #W.

In another embodiment, for antenna switching with xTyR in multi-TRP, the periodic/semi-persistent SRS resources in different periodic/semi-persistent resource sets toward different TRP should be configured with the same periodicity and different slot offset to avoid collision (or configured with the same periodicity, same slot offset and different OFDM symbol positions). The time gap between SRS resource sets toward different TRP should be sufficient for the UE to perform beam switching/panel switching. In another example, the periodic/semi-persistent SRS resource sets toward different TRP may be configured with different periodicity, and different OFDM symbol positions. Or the periodic/semi-persistent SRS resource sets toward different TRP may be configured with different periodicity.

For antenna switching xTyR with same TRP or single TRP, if multiple periodic/semi-persistent resource sets are configured, the periodic/semi-persistent SRS resources in the periodic/semi-persistent resource sets toward the same TRP should be configured with the same periodicity and different slot offset. Or the periodic/semi-persistent SRS resources in the periodic/semi-persistent resource sets toward the same TRP may be configured with the same periodicity, same slot offset and different OFDM symbol positions.

Scenario B: SRS for Carrier Switching in Single TRP Operation

In an embodiment, in order to reduce the RRC reconfiguration overhead, one or several additional aperiodic/semi-persistent/periodic SRS resource sets may be configured for SRS carrier switching. The aperiodic/semi-persistent/periodic SRS resource sets may be configured with usage set to 'antennaSwitching' and SRS power control state set to 'separateClosedLoop'. In one example, if the number of aperiodic SRS resource sets for antenna switching is M, then additional M aperiodic SRS resource sets may be defined for carrier switching.

In another embodiment, no additional SRS resource set is introduced dedicatedly for carrier switching. A new field may be introduced into DCI to dynamically change the SRS power control state. For carrier switching, the field should indicate a separate power control state as PUSCH.

In another embodiment, for carrier switching, the power control state of the aperiodic SRS resource set may be implicitly indicated by the DCI format. If the aperiodic SRS resource set with usage set to 'antennaSwitching' is triggered by DCI format 2_3, then the power control state of the SRS resource set will be implicitly changed to be separate power control state as PUSCH.

Scenario C: Mixed Configuration of xTyR for Antenna Switching

In an embodiment, in single TRP or multi-TRP case, the UE may be configured with multiple xTyR configurations and multiple periodic/semi-persistent SRS resource sets for antenna switching of different xTyR (for the multiple xTyR configuration, the number of Tx antennas, e.g., x, may be the same or different). For example, if the UE can support 2T4R, then the UE may be configured with periodic/semi-persistent SRS resource sets for both 1T4R and 2T4R at the same time. The UE can be configured with one periodic/semi-persistent SRS resource set for 2T4R (including 2 SRS resources, each has two SRS ports), and the UE can be configured with another periodic/semi-persistent SRS resource set for 1T4R (including 4 SRS resources, each has one SRS port).

The multiple periodic/semi-persistent SRS resource sets for different xTyR may be active at the same time or may not be active at the same time. Within each SRS resource set, the number of SRS ports is the same. Across different SRS resource set, the number of SRS ports may be the same or may be different.

MAC-CE may be used to activate/deactivate one periodic/semi-persistent SRS resource set, so that the dynamic switching between different xTyR may be achieved.

For example, the UE capable of 2T4R is configured with one semi-persistent SRS resource set for 2T4R and one semi-persistent SRS resource set for 1T4R. The gNB may send MAC-CE to activate the SRS resource set for 2T4R to enable the 2T4R antenna switching operation. If the gNB would like the UE to perform 1T4R operation, the gNB may send MAC-CE to activate the SRS resource set for 1T4R.

The MAC-CE may either activate or deactivate only one periodic/semi-persistent SRS resource set. Or the activation and deactivation can be performed via one MAC-CE.

In another embodiment, the periodic/semi-persistent SRS resource set may contain SRS resources with different number of SRS ports for different xTyR configuration. For example, the periodic/semi-persistent resource set may contain 2 SRS resources with 2 ports (for 2T4R), and also contain 4 SRS resources with 1 port (for 1T4R). MAC-CE may be used to activate/deactivate some SRS resources to enable/disable certain xTyR operation. For example, if the gNB would like to perform 2T4R operation, then the SRS resources with two ports should be activated. If the gNB would like to perform 1T4R operation, then the SRS resources with one port should be activated.

In another embodiment, in single TRP or multi-TRP case, the UE may be configured with multiple xTyR configurations and multiple aperiodic SRS resource sets for antenna switching of different xTyR (for the multiple xTyR configuration, the number of Tx antennas, e.g., x, may be the same or different). For example, if the UE can support 2T4R, then the UE may be configured with aperiodic SRS resource sets for both 1T4R and 2T4R at the same time. The UE can be configured with one aperiodic SRS resource set for 2T4R (including 2 SRS resources, each has two SRS ports), and the UE can be configured with another aperiodic SRS resource set for 1T4R (including 4 SRS resources, each has one SRS port).

The multiple aperiodic SRS resource sets for different xTyR, within each SRS resource set, the number of SRS ports is the same. Across different SRS resource set, the number of SRS ports may be the same or may be different.

The aperiodic SRS resource sets for different xTyR may be configured with different trigger state. Therefore, different trigger state may trigger corresponding xTyR operation with aperiodic SRS. For example, the aperiodic SRS resource set for 2T4R is configured with trigger state #1, and the aperiodic SRS resource set for 1T4R is configured with trigger state #2. In this way, when trigger state #1 is indicated via DCI, then 2T4R operation is triggered.

In another example, MAC-CE may be used to activate/deactivate one aperiodic SRS resource set. Only those activated aperiodic SRS resource sets may be triggered by DCI for transmission.

In another embodiment, the aperiodic SRS resource set may contain SRS resources with different number of SRS ports for different xTyR configuration. For example, the aperiodic resource set may contain 2 SRS resources with 2 ports (for 2T4R), and also contain 4 SRS resources with 1 port (for 1T4R). MAC-CE may be used to activate/deactivate some SRS resources. For example, if the gNB would like to perform 2T4R operation, then the SRS resources with two ports should be activated. If the gNB would like to perform 1T4R operation, then the SRS resources with one port should be activated.

In an embodiment, MAC-CE may be used by the gNB to update and/or reconfigure the number of antenna ports for SRS resource(s) within one or multiple SRS resource sets, wherein the SRS may be periodic or semi-persistent or aperiodic. The SRS may be used for antenna switching or other usages, such as codebook/non-codebook, beam management.

For example, for 2T4R antenna switching, one SRS resource set includes 2 SRS resources, and each SRS resource has two ports. The MAC-CE may re-configure the two SRS resources to be 1-port, which can be used as 1T2R. Therefore, the switching between 1T2R and 2T4R may be supported.

In another example, the MAC-CE may also activate/deactivate SRS resource(s) in one or multiple SRS resource sets. For example, the UE is capable of 2T8R and is configured with one SRS resource set containing 4 SRS resources, wherein each SRS resource has 2 ports. The MAC-CE may be used to deactivate two SRS resources, and reconfigure the remaining two SRS resources (or all the SRS resources) to be 1-port to enable 1T2R operation.

In another embodiment, the UE may report the xTyR configuration it wants to perform. The reporting may be periodic/semi-persistent/aperiodic. The reporting may be based on MAC-CE or RRC. For aperiodic reporting, it is triggered by DCI. For periodic or semi-persistent reporting, a timer may be introduced to control the reporting, wherein the timer is configured by gNB. After the xTyR antenna switching is enabled, the UE starts the timer. After the timer expires, the UE sends the reporting and then restart the timer.

Note: In all the embodiments of this disclosure, the term 'multi-TRP' may refer to single DCI multi-TRP and/or multi-DCI multi-TRP.

Beam Configuration for SRS With Antenna Switching

When SRS resource set is configured as 'aperiodic', the SRS resource set also includes configuration of trigger state(s) (aperiodicSRS-Resource Trigger, aperiodicSRS-ResourceTriggerList). The triggering state(s) defines which DCI codepoint(s) triggers the corresponding SRS resource set transmission.

For antenna switching, in Rel-15/Rel-16, it supports antenna configuration of xTyR with {x=1, 2, 4; y=1, 2, 4, and x<=y}.

In Rel-17, the antenna switching is extended with up to 8 Rx, e.g. xTyR with {x=1, 2, 4; y=1, 2, 4, 6, 8; x<=y}. Table 2 (recreated below for ease of reference) shows an example for the newly added antenna configuration (see 3GPP RAN1 #104-e meeting).

TABLE 2

| Aperiodic SRS resource set configuration for antenna switching in Rel-17 | | |
|---|---|---|
| xTyR | Candidate maximum number of aperiodic SRS resource sets | # of SRS ports per resource |
| 1T6R | 4 | 1 port |
| 1T8R | 4 | 1 port |
| 2T6R | 3 | 2 ports |
| 2T8R | 4 | 2 ports |
| 4T8R | 2 | 4 ports |

For antenna switching, based on channel reciprocity in TDD system, the gNB may derive the precoder for downlink transmission by measuring the channel from the transmitted SRS signal in uplink. For xTyR with x<y, multiple SRS resources/SRS resource sets are required to sound all the channels observed by different antenna.

In Rel-17, the beam indication may be delivered via DCI. The DCI may indicate:

Joint DL/UL TCI state

Separate DL/UL TCI state.

For beam indication via DCI in Rel-17, there is an application time, which defines the when the UE can utilize the indicated beam after the DCI is received.

In Rel-17, as shown in Table 2, there may be multiple aperiodic SRS resource sets configured for antenna switching, which will occupy multiple uplink slots for SRS transmission. In this case, it's possible that the UE receives signaling which changes the UE Tx beam, wherein the signaling may be received between the triggered aperiodic SRS resource sets. In this case, it should be clarified whether the UE should change beam for the rest of triggered SRS transmission. If the UE changes beam, then the measurement results over multiple SRS resource sets are from different beams, which is not desirable.

Figure 7:
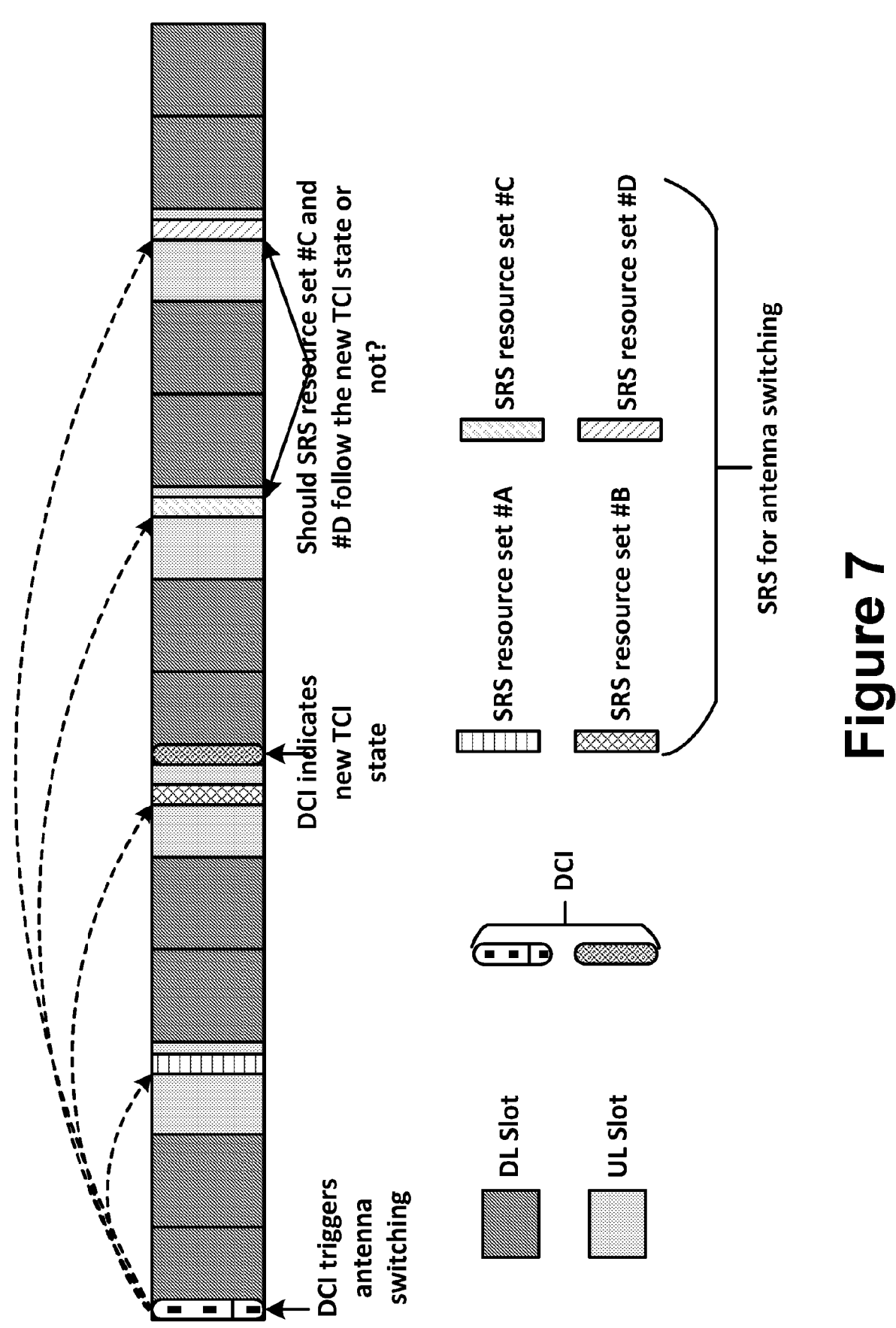
FIG. 7 illustrates beam change signaling received between triggered aperiodic SRS resource sets for antenna switching, in accordance with various embodiments.

FIG. 7 illustrates an example of the issue.

The current SRS antenna switching does not yet consider beam change signaling received during the antenna switching procedure.

Embodiments described herein may be directed to beam configuration/update for SRS antenna switching considering the beam change signaling received during the antenna switching procedure.

Beam Configuration for SRS With Antenna Switching

In embodiments, for SRS with antenna switching performed by the same TRP, all the SRS resources contained in all the aperiodic SRS resource sets triggered by the same DCI should be configured with the same beam (it may also be applied for single TRP operation). For SRS with antenna switching performed by different TRP, different beam may be applied for SRS toward different TRP. The beam may be configured by RRC, or updated by MAC-CE, or indicated by DCI For SRS with antenna switching performed by the same TRP, all the aperiodic SRS resource sets triggered by the same DCI should be configured with the same value for the following parameters: alpha, p0, pathlossReferenceRS, srs-PowerControl AdjustmentState (it may also be applied for single TRP operation). For SRS with antenna switching performed by different TRP, different value of the parameters may be applied for SRS resource sets toward different TRP. The parameters (alpha, p0, pathlossReferenceRS, srs-PowerControlAdjustmentState) may be configured by RRC, or updated by MAC-CE, or indicated by DCI. In another example, the pathlossReferenceRS may be derived from the joint DL/UL TCI state or the separate UL TCI state.

In another example, for SRS with antenna switching performed by the same TRP, all the SRS resources contained in one aperiodic SRS resource set should be configured with the same beam (it may also be applied for single TRP operation), wherein the beam may be configured by RRC, or updated by MAC-CE, or indicated by DCI. For SRS with antenna switching performed by different TRP, different beam may be applied for SRS resource set toward different TRP.

In embodiments, the MAC-CE to update pathloss reference signal for SRS may be updated for accommodate multiple SRS resource sets, in order to reduce the signaling. The SRS resource set(s) in the MAC-CE may be configured with the same or different usage (codebook, non-codebook, antennaSwitching, beamManagement). And the SRS resource set may be periodic, semi-persistent, or aperiodic.

Figure 8:
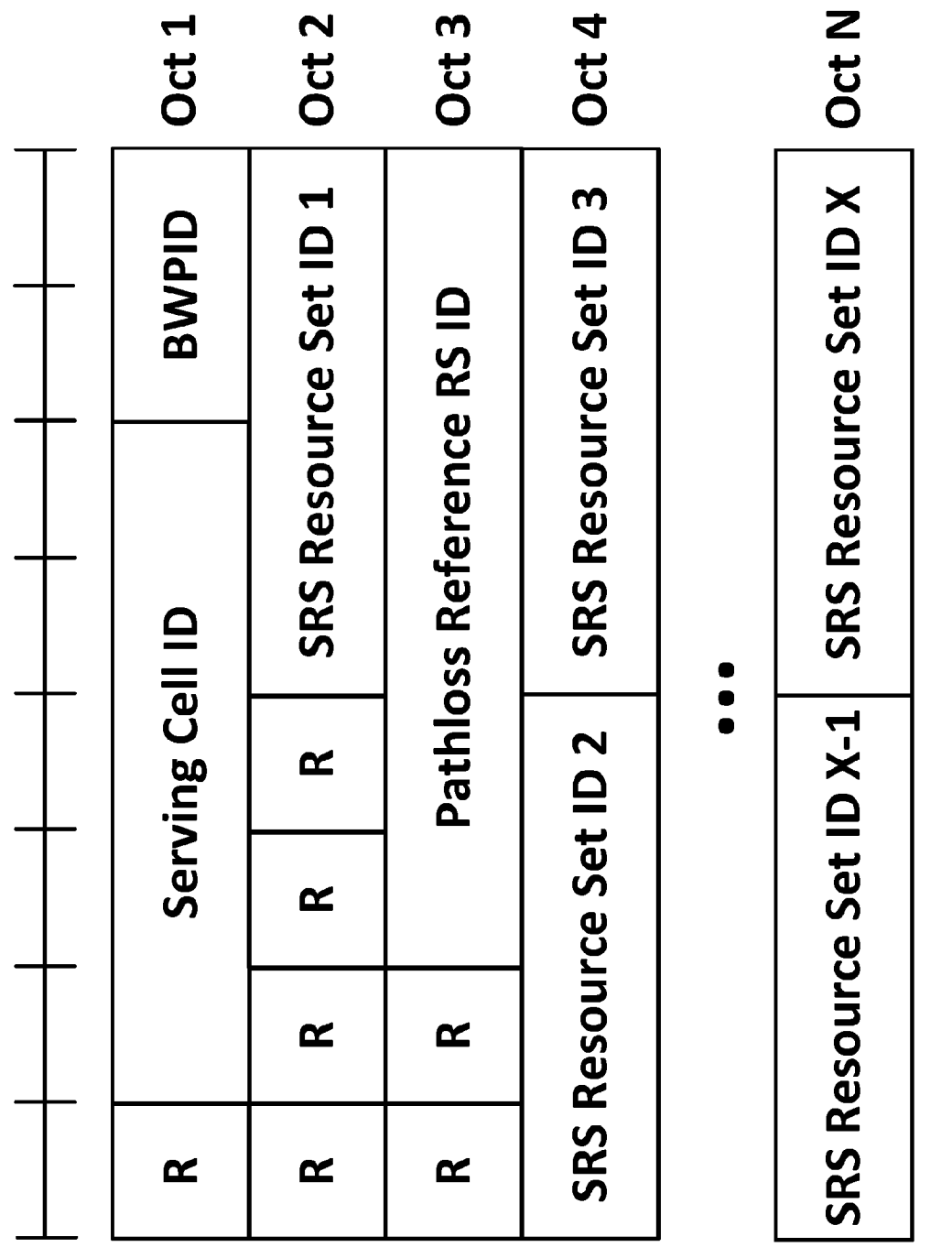
FIG. 8 illustrates an example of a medium access control element (MAC CE) with a one-to-one mapping between the SRS resource set ID and the pathloss reference signal (RS) ID.

FIG. 8 shows an example of the MAC-CE, wherein the pathloss reference RS ID in the MAC-CE may be applied to all the SRS resource sets indicated by the SRS Resource Set IDs in the MAC-CE.

FIG. 9 shows another example of the MAC-CE, wherein there is a one-to-one mapping between the SRS resource set ID and the pathloss reference RS ID.

In another example, the MAC-CE may also update the value of the parameters such as alpha, p0, srs-PowerControlAdjustmentState. For example, the srs-PowerControl AdjustmentState may also be added into the MAC-CE. And a list of {p0, alpha} may be configured by RRC and the MAC-CE will select one entry for one SRS resource set. Or a list of {p0, alpha, srs-PowerControlAdjustmentState} may be configured by RRC and the MAC-CE will select one entry for one SRS resource set.

The same pathloss reference signal should be configured by the MAC-CE for SRS resource sets configured with antenna switching for the same TRP (it may also be applied for single TRP operation).

In embodiments, the MAC-CE to update spatial relation for SRS may be defined to accommodate multiple SRS resource sets. The SRS resource set(s) in the MAC-CE may be configured with the same or different usage (codebook, non-codebook, antennaSwitching, beam Management). And the SRS resource set may be periodic, semi-persistent, or aperiodic.

Figure 10:
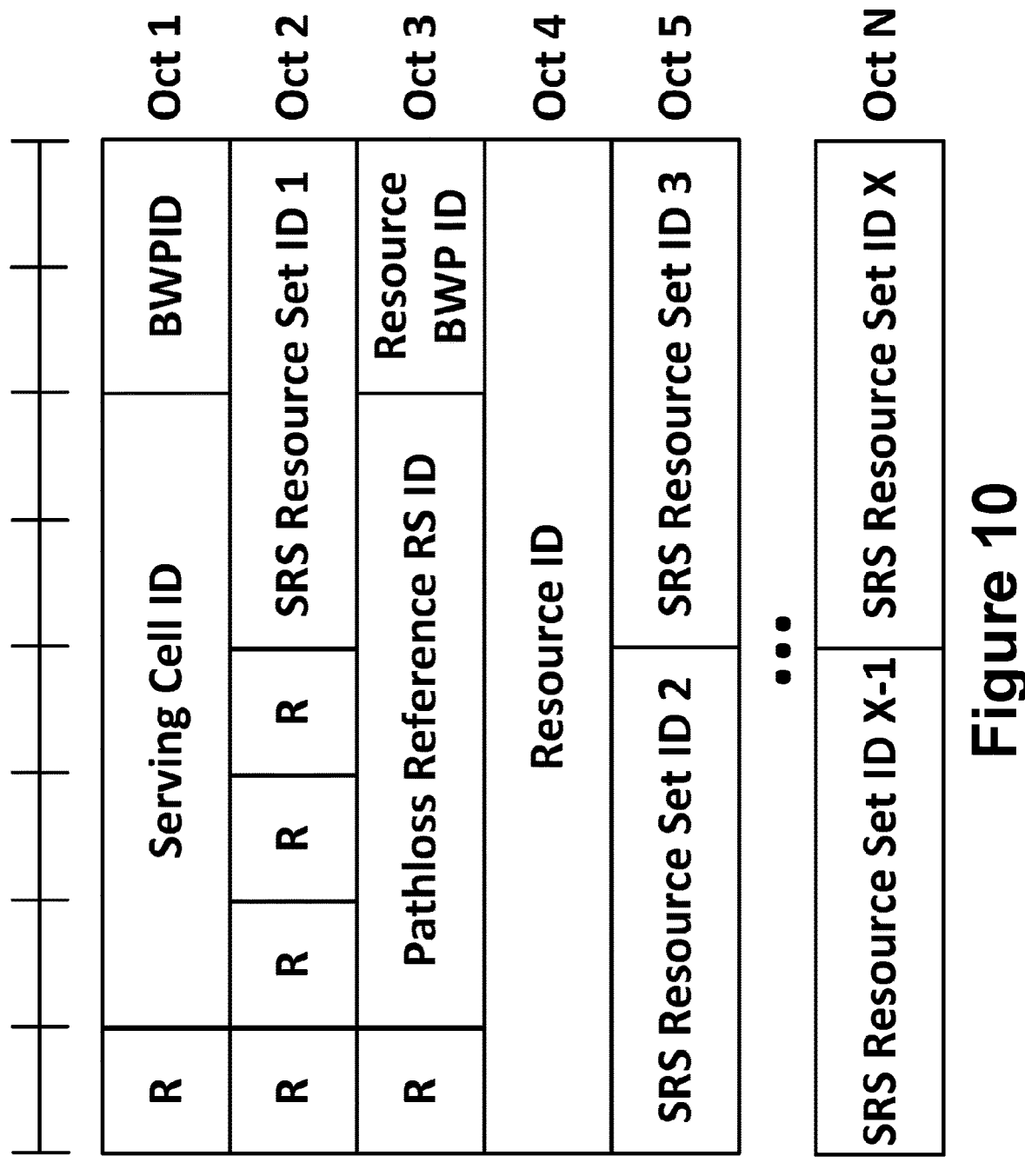
FIG. 10 illustrates an example of MAC-CE to update spatial relation for multiple SRS resource sets, in accordance with various embodiments.

FIG. 10 shows an example of the MAC-CE to update spatial relation for multiple SRS resource sets, wherein the same spatial relation is applied to all the SRS resource sets indicated by the SRS Resource Set IDs in the MAC-CE. The field F indicates the type of Resource ID, e.g. whether it is SSB, or non-zero power (NZP) CSI-RS or SRS. If 'F' is set to '1', it indicates the Resource ID is NZP CSI-RS. If 'F' is set to '0', then the first bit of Resource ID is always set to '0'. If 'F' is set to '0' and the second bit of Resource ID is set to '0', then the remaining bits of Resource ID indicates an SRS resource ID. If 'F' is set to '0' and the second bit of Resource ID is set to '1', then the remaining bits of Resource ID indicates an SSB index.

In another example, the MAC-CE may include multiple spatial relations and multiple SRS resource sets, and there is one-to-one mapping between the spatial relation and the SRS resource set.

In another example, the legacy MAC-CE to update spatial relation for aperiodic or semi-persistent SRS may be updated to be applied for multiple SRS resource sets. All the SRS resources in multiple SRS resource sets may be included and each SRS resource should be configured with one spatial relation.

The same spatial relation should be configured by the MAC-CE for SRS resource sets configured with antenna switching for the same TRP (it may also be applied for single TRP operation). Or the same spatial relation should be configured by the MAC-CE for all the SRS resources within one SRS resource set configured with antenna switching.

In embodiments, if multiple aperiodic SRS resource sets are triggered for antenna switching toward different TRP by the same DCI, then the multiple SRS resource sets are expected to be transmitted in sequential manner to avoid frequent beam change, e.g. after transmitting all the SRS resource sets to the $1^{st}$ TRP, the UE begins to transmit the SRS resource sets to the $2^{nd}$ TRP. For example, M SRS resource sets are configured for antenna switching with TRP #1, N SRS resource sets are configured for antenna switching with TRP #2. If both M and N SRS resource sets are triggered by the same DCI, the M SRS resource sets to TRP #1 should be transmitted and then the N SRS resource sets to TRP #2 may be transmitted. This embodiment may be applied for the SRS configured with other usages, e.g. codebook, non-codebook and beamManagement. This embodiment may also be applied to the case that aperiodic SRS resource sets with different usages are triggered by the same DCI in multi-TRP.

Figure 11:
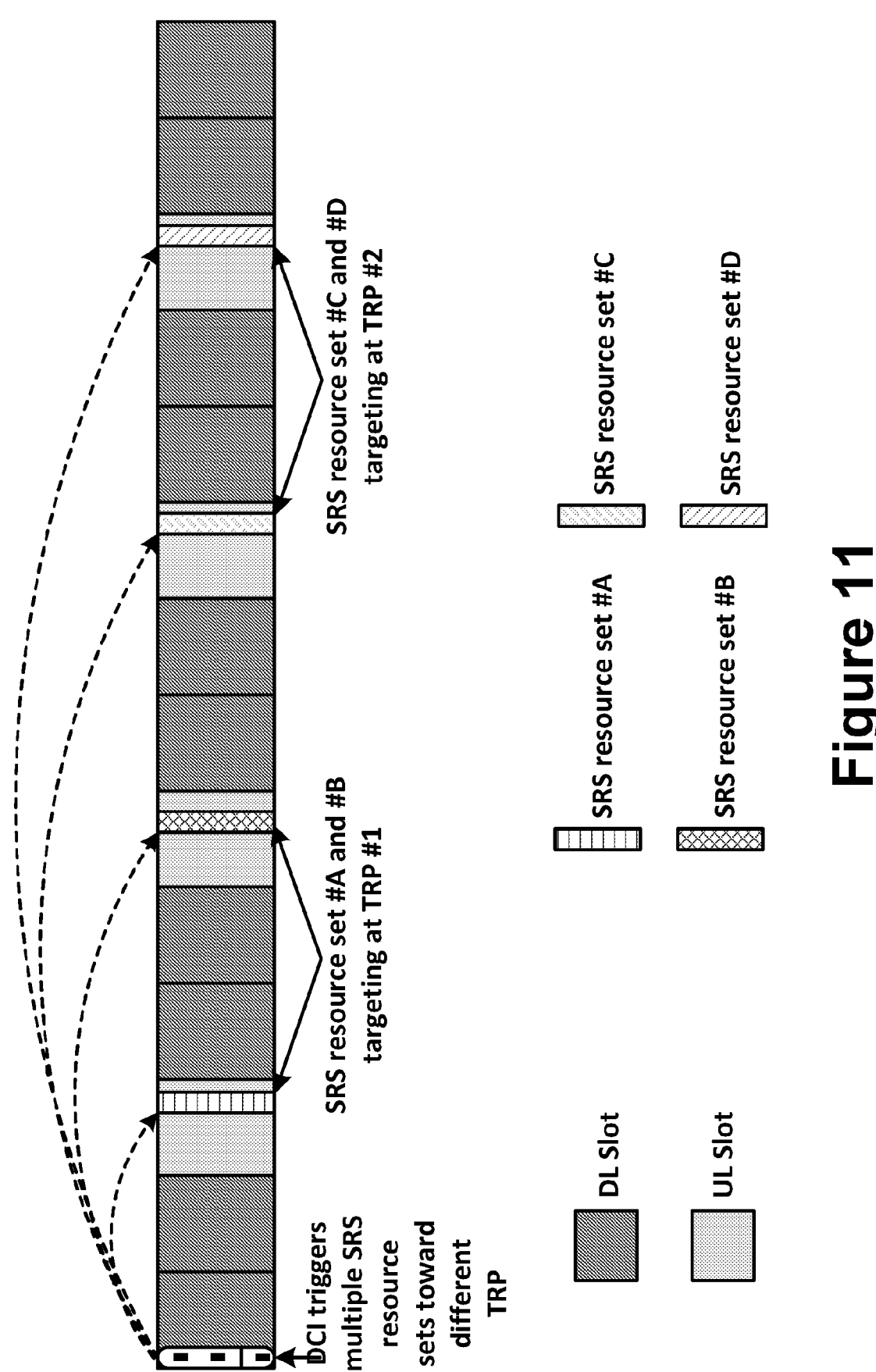
FIG. 11 illustrates an example of sequential SRS transmission toward different TRP, in accordance with various embodiments.

FIG. 11 shows an example of the sequential SRS transmission toward different TRP.

Figure 12:
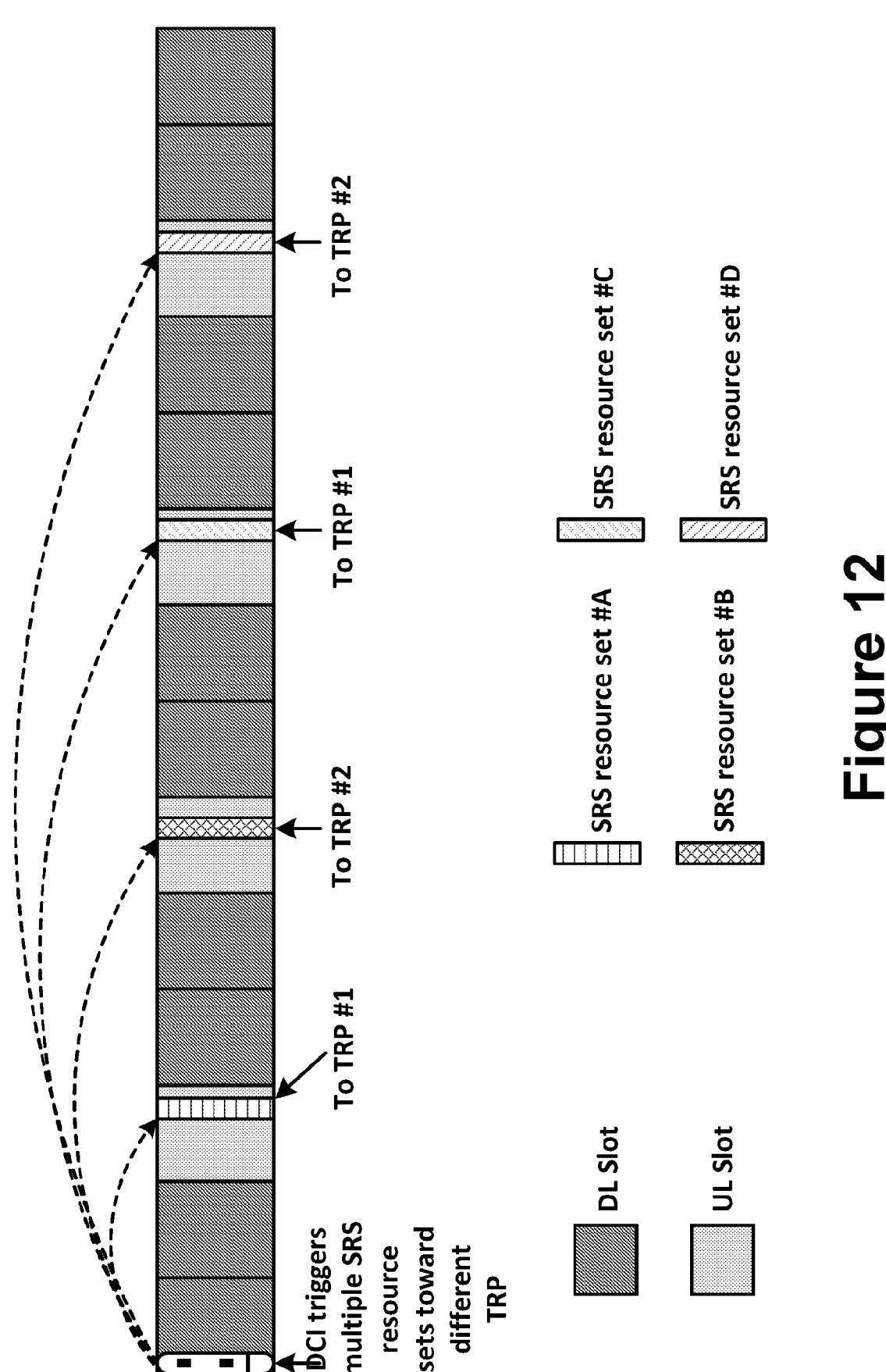
FIG. 12 illustrates an example of interlaced SRS transmission toward different TRP, in accordance with various embodiments.

In embodiments, the UF may be configured with interlaced transmission for multiple aperiodic SRS resource sets in multi-TRP. This embodiment may be applied for the SRS configured with other usages, e.g. codebook, non-codebook and beamManagement. This embodiment may also be applied to the case that aperiodic SRS resource sets with different usages are triggered by the same DCI in multi-TRP. FIG. 12 shows an example of the operation.

In another example, the UE is not expected to be configured with interlaced transmission for multiple aperiodic SRS resource sets in multi-TRP.

In embodiments, if TCI state is used for uplink beam indication in multi-TRP, multiple TCI states should be indicated to the UE (or one TCI state corresponds to two beams, one from each TRP). The TCI state may be associated with different TRP implicitly or explicitly. When transmitting SRS (e.g., including periodic, semi-persistent, and/or aperiodic), the applied TCI state may be determined by the TRP associated with the SRS resource set, for example, via the SRS power control adjustment state.

In embodiments, for SRS antenna switching in the scenario of multi-TRP, the UE is not expected to be triggered with antenna switching toward different TRPs by the same DCI. E.g. one DCI can only trigger the antenna switching toward one TRP.

In embodiments, for SRS antenna switching, the aperiodic SRS resource sets should be configured to be transmitted over consecutive uplink slots.

Timing for Beam Update for SRS With Antenna Switching Legacy Spatial Relation

In embodiments, if the legacy spatial relation is applied for SRS with antenna switching, then the same spatial relation should be applied for all the SRS resources contained in all the SRS resource sets toward the same TRP (it may also be applied for single TRP operation). If SRS antenna switching is performed among different TRP, different spatial relation may be applied for SRS transmitted to different TRP.

In embodiments, for SRS with antenna switching, if multiple SRS resource sets are triggered toward the same TRP, during the time period $\Delta T$ from the transmission of the first SRS resource set until the last SRS resource set, the following options may be applied (this embodiment may also be applied for single TRP operation):

During the period of $\Delta T$, the UE is not expected to receive MAC-CE updating spatial relation/pathloss reference RS toward the same TRP. And/or a previously received MAC-CE updating spatial relation/pathloss reference RS toward the same TRP is not expected to become valid during the time period of $\Delta T$.

During the period of $\Delta T$, the UE may receive MAC-CE updating spatial relation/pathloss reference RS toward the same TRP, but the spatial relation/pathloss reference RS will not become valid during the time period of $\Delta T$ (the time is not enough for the application of the MAC-CE), therefore the indicated TCI is not used for the rest SRS.

During the period of $\Delta T$, the UE may receive MAC-CE updating spatial relation/pathloss reference RS toward the same TRP or a previously received MAC-CE updating spatial relation/pathloss reference RS toward the same TRP becomes valid, but it will be discarded by the UE.

During the period of $\Delta T$, the UE may receive MAC-CE updating spatial relation/pathloss reference RS toward the same TRP or a previously received MAC-CE updating spatial relation/pathloss reference RS toward the same TRP becomes valid, but the spatial relation/pathloss reference RS is not applied for the transmission of the rest SRS resources.

During the period of $\Delta T$, the UE may receive MAC-CE updating spatial relation/pathloss reference RS toward the same TRP or a previously received MAC-CE updating spatial relation/pathloss reference RS toward the same TRP becomes valid, then the spatial relation/pathloss reference RS may be applied for the transmission of the rest SRS resources.

In another example, during the period of $\Delta T$, the following options may be applied:

During the period of $\Delta T$, the UE is not expected to receive MAC-CE updating spatial relation/pathloss reference RS toward the different TRP or a previously received MAC-CE updating spatial relation/pathloss reference RS toward different TRP is not expected to become valid.

During the period of ΔT, the UE may receive MAC-CE updating spatial relation/pathloss reference RS toward the different TRP or a previously received MAC-CE updating spatial relation/pathloss reference RS toward different TRP becomes valid, but it will be discarded by the UE.

During the period of ΔT, the UE may receive MAC-CE updating spatial relation/pathloss reference RS toward different TRP or a previously received MAC-CE updating spatial relation/pathloss reference RS toward different TRP becomes valid. The spatial relation/pathloss reference RS may be applied for the communication with another TRP if there is no on-going aperiodic SRS antenna switching with another TRP. Otherwise, the joint spatial relation/pathloss reference RS toward different TRP should be discarded.

During the period of ΔT, the UE may receive MAC-CE updating spatial relation/pathloss reference RS toward different TRP or a previously received MAC-CE updating spatial relation/pathloss reference RS toward different TRP becomes valid. The spatial relation/pathloss reference RS may be applied for the communication with another TRP.

In embodiments, for aperiodic SRS with antenna switching, prior to the transmission of the first SRS resource, if the UE receives MAC-CE updating spatial relation/pathloss reference RS and the MAC-CE application time is enough before the SRS transmission, then the updated spatial relation/pathloss reference RS may be applied for the SRS transmission.

Joint DL/UL TCI State

In embodiments, if joint DL/UL TCI state may be applied for SRS with antenna switching, then the same joint DL/UL TCI state should be applied for all the SRS resources contained in all the SRS resource sets toward the same TRP (it may also be applied for single TRP operation). If SRS antenna switching is performed among different TRP, different joint DL/UL TCI state may be applied for SRS transmitted to different TRP.

Figure 13:
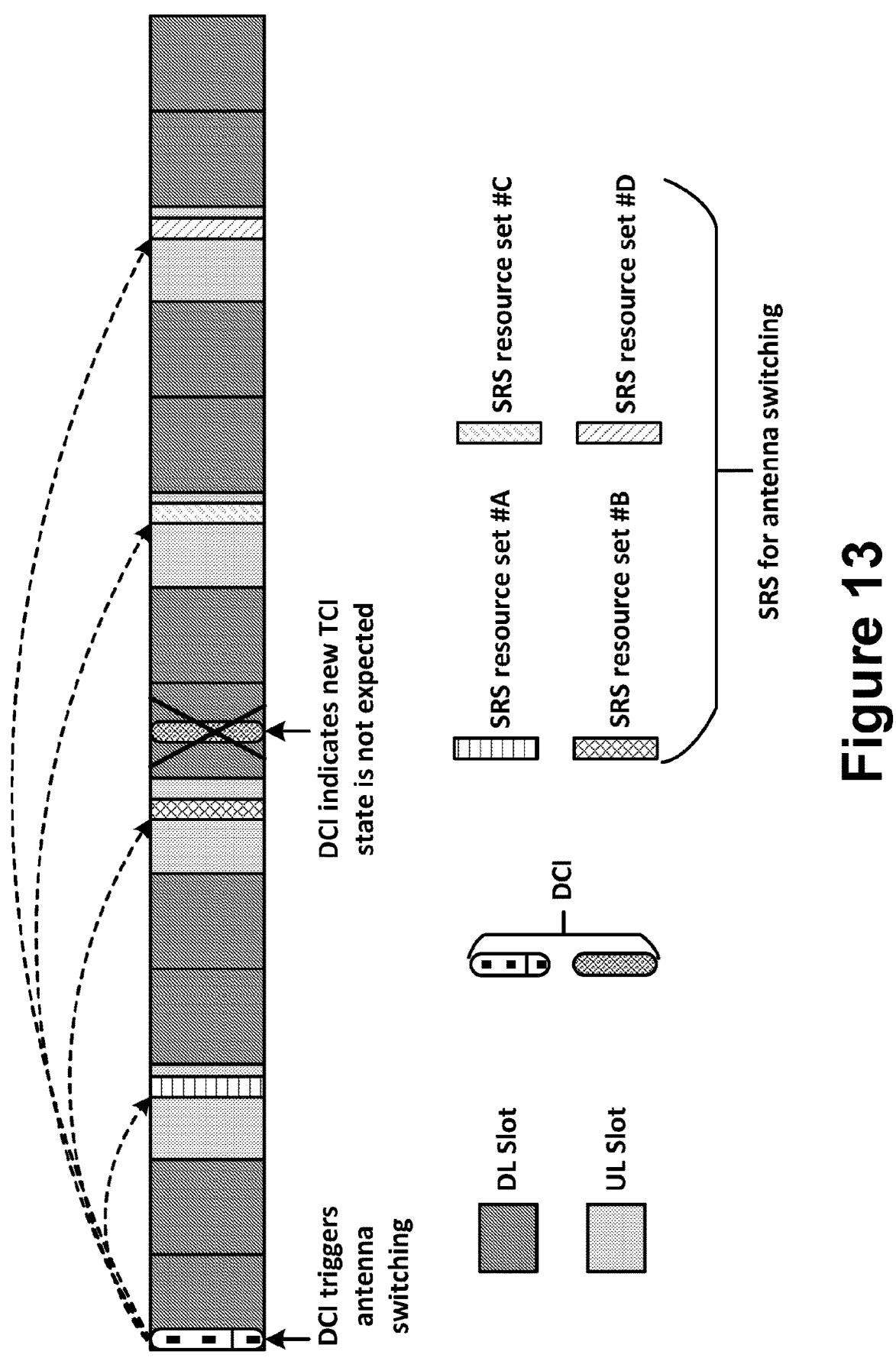
FIG. 13 illustrates an example of no indication of new beam during the ongoing SRS transmission for antenna switching, in accordance with various embodiments.

In embodiments, for SRS with antenna switching, if multiple SRS resource sets are triggered toward the same TRP, during the time period ΔT from the transmission of the first SRS resource set until the last SRS resource set, the following options may be applied (this embodiment may also be applied for single TRP operation):

During the period of ΔT, the UE is not expected to receive DCI indicating another joint DL/UL TCI state toward the same TRP, as shown in FIG. 13. And/or a previously indicated joint DL/UL TCI state toward the same TRP is not expected to become valid during the time period of ΔT.

During the period of ΔT, the UE may receive DCI indicating another joint DL/UL TCI state toward the same TRP, but the joint DL/UL TCI state will not become valid during the time period of ΔT (the time is not enough for the application of the indicated TCI state), therefore the indicated TCI is not used for the rest SRS.

During the period of ΔT, the UE may receive DCI indicating another joint DL/UL TCI state toward the same TRP or a previously indicated joint DL/UL TCI state toward the same TRP becomes valid, but it will be discarded by the UE.

During the period of ΔT, the UE may receive DCI indicating another joint DL/UL TCI state toward the same TRP or a previously indicated joint DL/UL TCI state toward the same TRP becomes valid, but the joint TCI state is not applied for the transmission of the rest SRS resources.

During the period of ΔT, the UE may receive DCI indicating another joint DL/UL TCI state toward the same TRP or a previously indicated joint DL/UL TCI state toward the same TRP becomes valid, then the joint TCI state may be applied for the transmission of the rest SRS resources.

In another example, during the period of ΔT, the following options may be applied:

During the period of ΔT, the UE is not expected to receive DCI indicating joint DL/UL TCI state toward the different TRP or a previously indicated joint DL/UL TCI state toward different TRP is not expected to become valid.

During the period of ΔT, the UE may receive DCI indicating joint DL/UL TCI state toward the different TRP or a previously indicated joint DL/UL TCI state toward different TRP becomes valid, but it will be discarded by the UE.

During the period of ΔT, the UE may receive DCI indicating joint DL/UL TCI state toward different TRP or a previously indicated joint DL/UL TCI state toward different TRP becomes valid. The joint DL/UL TCI state may be applied for the communication with another TRP if there is no on-going aperiodic SRS antenna switching with another TRP. Otherwise, the joint DL/UL TCI state toward different TRP should be discarded.

During the period of ΔT, the UE may receive DCI indicating joint DL/UL TCI state toward different TRP or a previously indicated joint DL/UL TCI state toward different TRP becomes valid. The joint DL/UL TCI state may be applied for the communication with another TRP.

In embodiments, for aperiodic SRS with antenna switching, prior to the transmission of the first SRS resource, if the UE receives joint DL/UL TCI state and the beam application time is enough for UE beam switching/panel switching, then the joint TCI state may be applied for the SRS transmission.

Separate DL/UL TCI State

In embodiments, if separate DL/UL TCI state may be applied for SRS with antenna switching, then the same UL TCI state should be applied for all the SRS resources contained in all the SRS resource sets toward the same TRP (it may also be applied for single TRP operation). If SRS antenna switching is performed among different TRP, different UL TCI state may be applied for SRS transmitted to different TRP.

In embodiments, for SRS with antenna switching, if multiple SRS resource sets are triggered toward the same TRP, during the time period ΔT from the transmission of the first SRS resource set until the last SRS resource set, the following options may be applied (this embodiment may also be applied for single TRP operation):

During the period of ΔT, the UE is not expected to receive DCI indicating another separate UL TCI state toward the same TRP. And/or a previously indicated separate UL TCI state toward the same TRP is not expected to become valid during the time period of ΔT.

During the period of ΔT, the UE may receive DCI indicating another separate UL TCI state toward the same TRP, but the separate UL TCI state will not become valid during the time period of ΔT (the time is not enough for the application of the indicated TCI state), therefore the indicated TCI is not used for the rest SRS.

During the period of ΔT, the UE may receive DCI indicating another separate UL TCI state toward the same TRP or a previously indicated separate UL TCI state toward the same TRP becomes valid, but it will be discarded by the UE.

During the period of ΔT, the UE may receive DCI indicating another separate UL TCI state toward the same TRP or a previously indicated separate UL TCI state toward the same TRP becomes valid, but the UL TCI state is not applied for the transmission of the rest SRS resources.

During the period of ΔT, the UE may receive DCI indicating another separate UL TCI state toward the same TRP or a previously indicated separate UL TCI state toward the same TRP becomes valid, then the UL TCI state may be applied for the transmission of the rest SRS resources.

In another example, during the period of ΔT, the following options may be applied:

During the period of ΔT, the UE is not expected to receive DCI indicating separate UL TCI state toward the different TRP or a previously indicated separate UL TCI state toward different TRP is not expected to become valid.

During the period of ΔT, the UE may receive DCI indicating separate UL TCI state toward the different TRP or a previously indicated separate UL TCI state toward different TRP becomes valid, but it will be discarded by the UE.

During the period of ΔT, the UE may receive DCI indicating separate UL TCI state toward different TRP or a previously indicated separate UL TCI state toward different TRP becomes valid. The separate UL TCI state may be applied for the communication with another TRP if there is no on-going aperiodic SRS antenna switching with another TRP. Otherwise, the separate UL TCI state toward different TRP should be discarded.

During the period of ΔT, the UE may receive DCI indicating separate UL TCI state toward different TRP or a previously indicated separate UL TCI state toward different TRP becomes valid. The separate UL TCI state may be applied for the communication with another TRP.

In embodiments, for aperiodic SRS with antenna switching, prior to the transmission of the first SRS resource, if the UE receives separate UL TCI state and the beam application time is enough for UE beam switching/panel switching, then the UL TCI state may be applied for the SRS transmission.

In embodiments, the UE is not expected to perform antenna switching if separate DL/UL TCI state is used. SRS antenna switching is applicable for the UE if joint DL/UL TCI state is used. The SRS for antenna switching includes aperiodic SRS, semi-persistent SRS and periodic SRS.

In embodiments, if the UE is configured with separate DL/UL TCI state, the UE may perform antenna switching. The SRS for antenna switching will be transmitted using the separate DL TCI state. The SRS for antenna switching includes aperiodic SRS, semi-persistent SRS and periodic SRS.

In another example, the SRS for antenna switching may be transmitted using the separate UL TCI state.

Systems and Implementations

Figure 14:
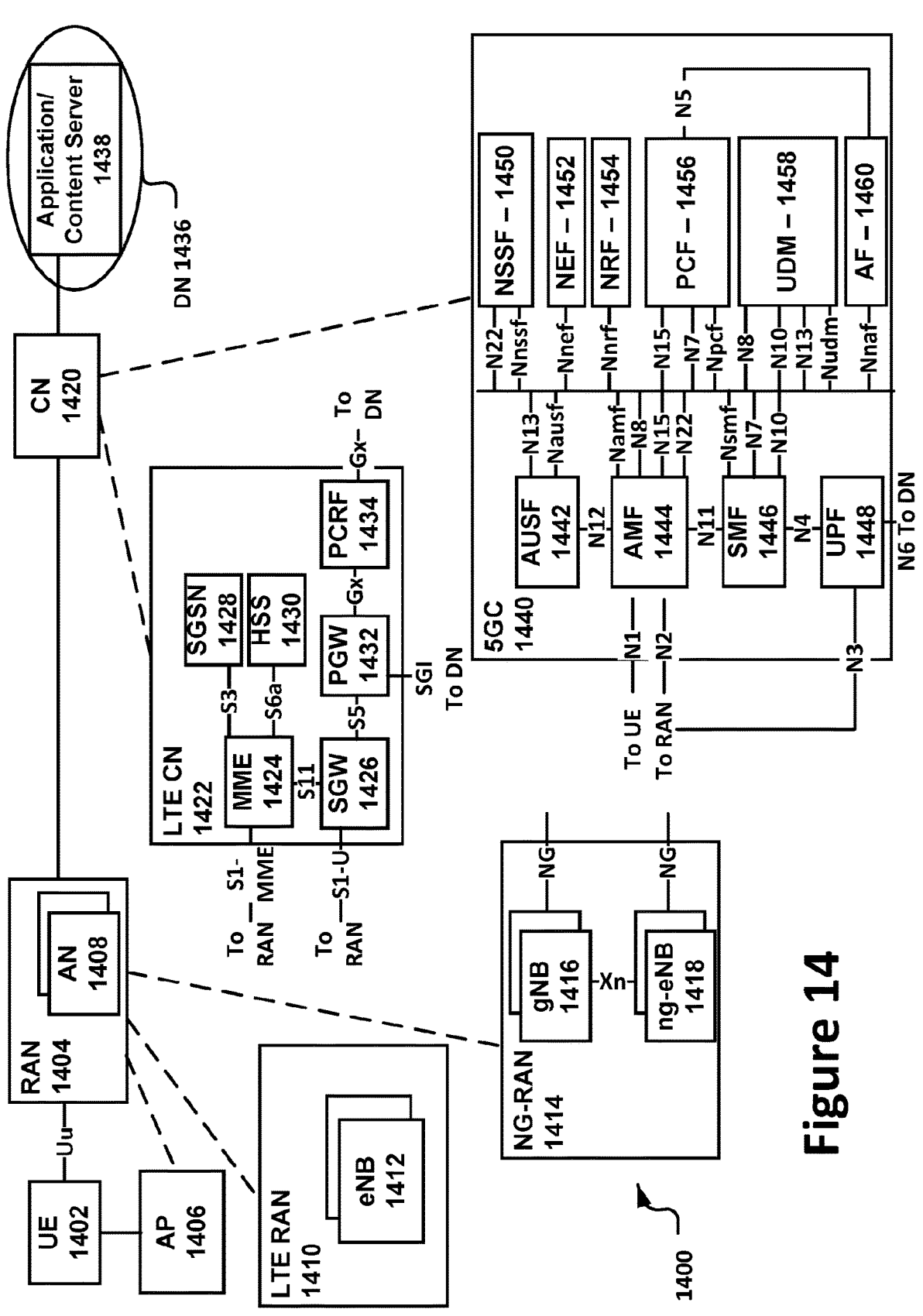
FIG. 14 illustrates a network in accordance with various embodiments.
Figure 15:
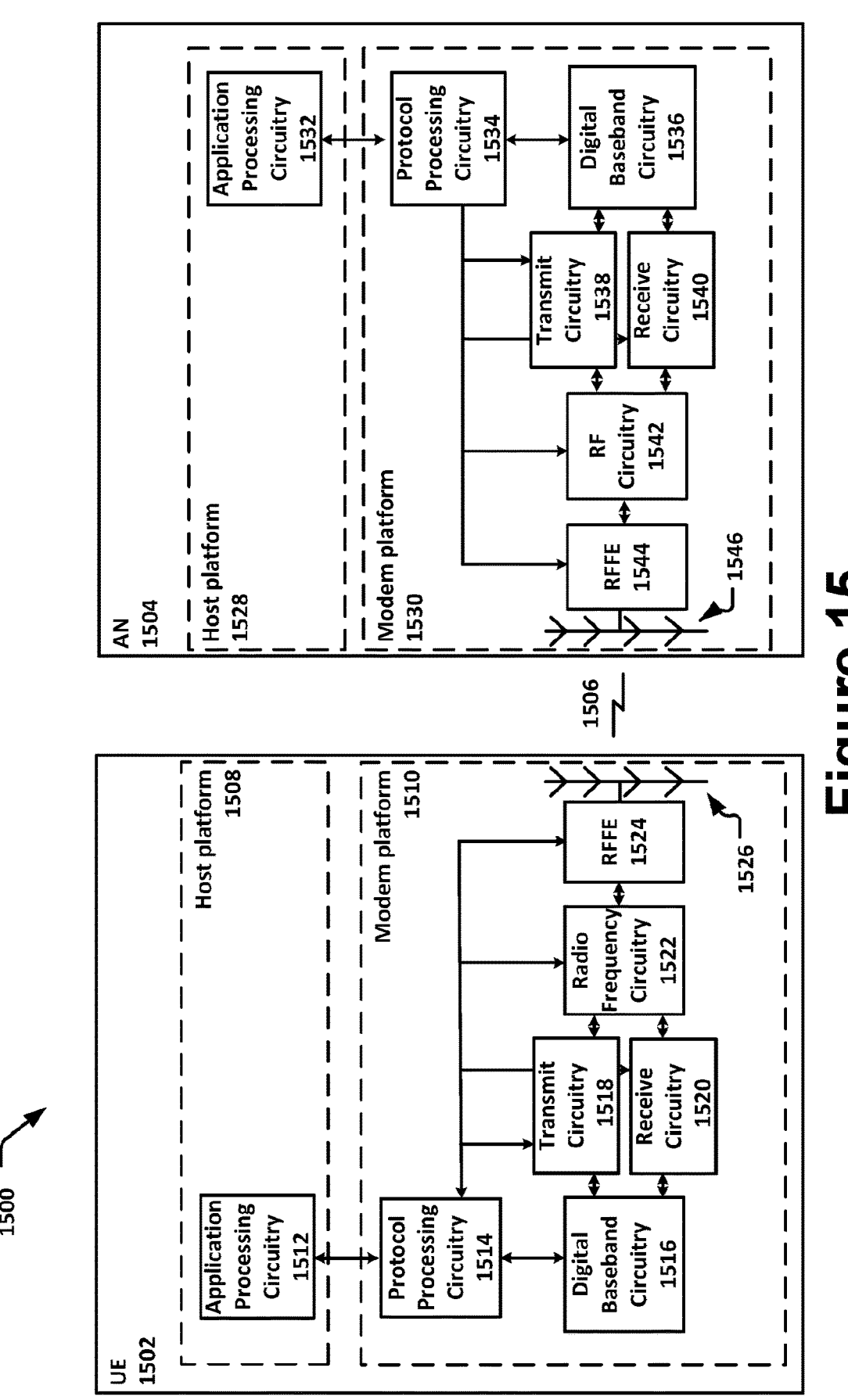
FIG. 15 schematically illustrates a wireless network in accordance with various embodiments.
Figure 16:
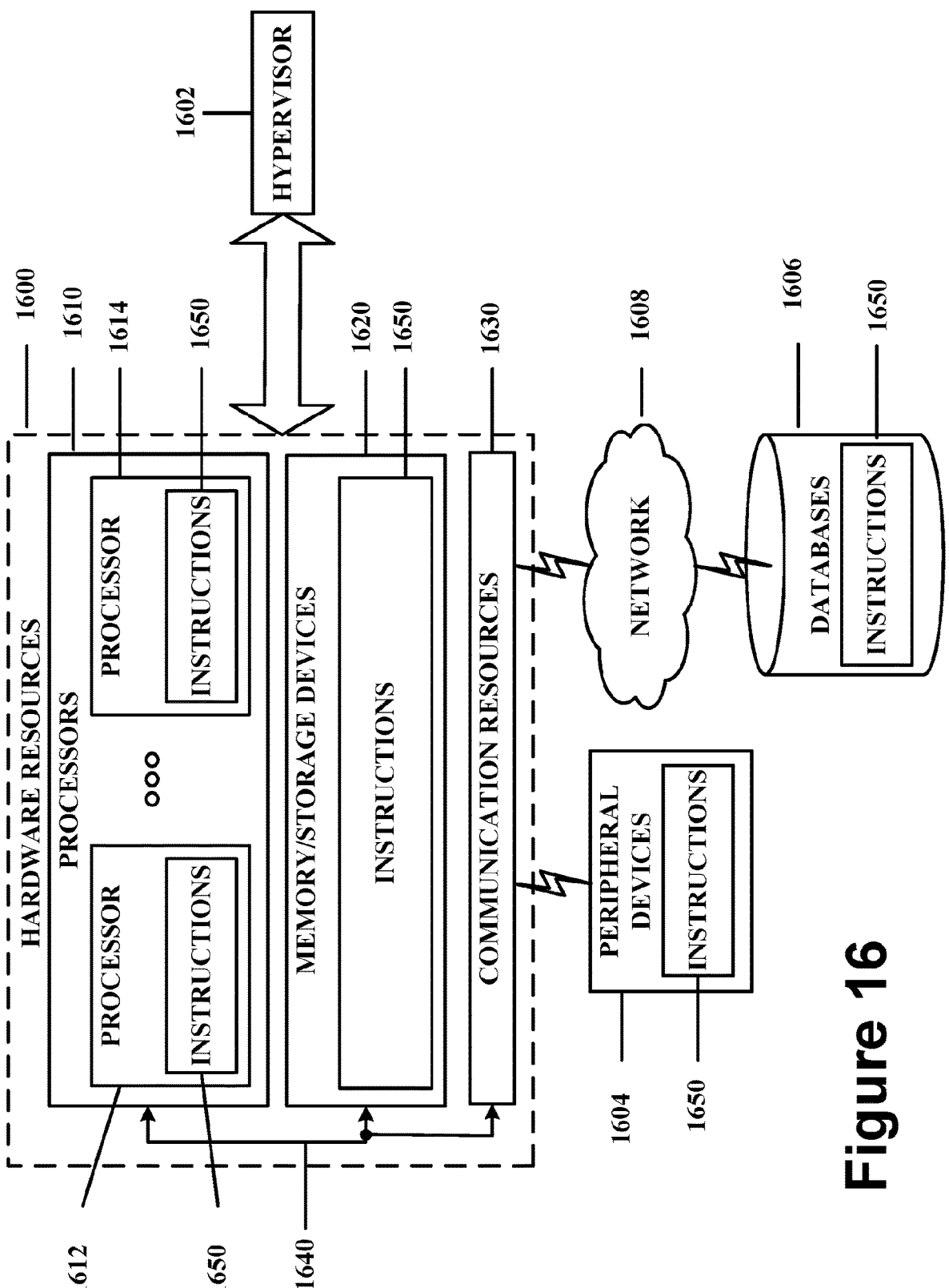
FIG. 16 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 14-16 illustrate various systems, devices, and components that may implement aspects of disclosed embodiments.

FIG. 14 illustrates a network 1400 in accordance with various embodiments. The network 1400 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1400 may include a UE 1402, which may include any mobile or non-mobile computing device designed to communicate with a RAN 1404 via an over-the-air connection. The UE 1402 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1400 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1402 may additionally communicate with an AP 1406 via an over-the-air connection. The AP 1406 may manage a WLAN connection, which may serve to offload some/all network traffic from the RAN 1404. The connection between the UE 1402 and the AP 1406 may be consistent with any IEEE 802.11 protocol, wherein the AP 1406 may be a wireless fidelity (Wi-Fi®) router. In some embodiments, the UF 1402, RAN 1404, and AP 1406 may utilize cellular-WLAN aggregation (for example, LWA/LWIP). Cellular-WLAN aggregation may involve the UE 1402 being configured by the RAN 1404 to utilize both cellular radio resources and WLAN resources.

The RAN 1404 may include one or more access nodes, for example, AN 1408. AN 1408 may terminate air-interface protocols for the UE 1402 by providing access stratum protocols including RRC, PDCP, RLC, MAC, and LI protocols. In this manner, the AN 1408 may enable data/voice connectivity between CN 1420 and the UE 1402. In some embodiments, the AN 1408 may be implemented in a discrete device or as one or more software entities running on server computers as part of, for example, a virtual network, which may be referred to as a CRAN or virtual baseband unit pool. The AN 1408 be referred to as a BS, gNB, RAN node, eNB, ng-eNB, NodeB, RSU, TRxP, TRP, etc. The AN 1408 may be a macrocell base station or a low power base station for providing femtocells, picocells or other like cells having smaller coverage areas, smaller user capacity, or higher bandwidth compared to macrocells.

In embodiments in which the RAN 1404 includes a plurality of ANs, they may be coupled with one another via an X2 interface (if the RAN 1404 is an LTE RAN) or an Xn interface (if the RAN 1404 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1404 may each manage one or more cells, cell groups, component carriers, etc. to provide the UE 1402 with an air interface for network access. The UE 1402 may be simultaneously connected with a plurality of cells provided by the same or different ANs of the RAN 1404. For example, the UE 1402 and RAN 1404 may use carrier aggregation to allow the UE 1402 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 1404 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UF 1402 or AN 1408 may be or act as a RSU, which may refer to any transportation infrastructure entity used for V2X communications. An RSU may be implemented in or by a suitable AN or a stationary (or relatively stationary) UE. An RSU implemented in or by: a UF may be referred to as a "UF-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1404 may be an LTE RAN 1410 with eNBs, for example, eNB 1412. The LTE RAN 1410 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1404 may be an NG-RAN 1414 with gNBs, for example, gNB 1416, or ng-eNBs, for example, ng-e NB 1418. The gNB 1416 may connect with 5G-enabled UEs using a 5G NR interface. The gNB 1416 may connect with a 5G core through an NG interface, which may include an N2 interface or an N3 interface. The ng-eNB 1418 may also connect with the 5G core through an NG interface, but may connect with a UE via an LTE air interface. The gNB 1416 and the ng-eNB 1418 may connect with each other over an Xn interface.

In some embodiments, the NG interface may be split into two parts, an NG user plane (NG-U) interface, which carries traffic data between the nodes of the NG-RAN 1414 and a UPF 1448 (e.g., N3 interface), and an NG control plane (NG-C) interface, which is a signaling interface between the nodes of the NG-RAN 1414 and an AMF 1444 (e.g., N2 interface).

The NG-RAN 1414 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1402 can be configured with multiple BWPs where each BWP configuration has a different SCS. When a BWP change is indicated to the UE 1402, the SCS of the transmission is changed as well. Another use case example of BWP is related to power saving. In particular, multiple BWPs can be configured for the UE 1402 with different amount of frequency resources (for example, PRBs) to support data transmission under different traffic loading scenarios. A BWP containing a smaller number of PRBs can be used for data transmission with small traffic load while allowing power saving at the UE 1402 and in some cases at the gNB 1416. A BWP containing a larger number of PRBs can be used for scenarios with higher traffic load.

The RAN 1404 is communicatively coupled to CN 1420 that includes network elements to provide various functions to support data and telecommunications services to customers/subscribers (for example, users of UE 1402). The components of the CN 1420 may be implemented in one physical node or separate physical nodes. In some embodiments, NFV may be utilized to virtualize any or all of the functions provided by the network elements of the CN 1420 onto physical compute/storage resources in servers, switches, etc. A logical instantiation of the CN 1420 may be referred to as a network slice, and a logical instantiation of a portion of the CN 1420 may be referred to as a network sub-slice.

In some embodiments, the CN 1420 may be an LTE CN 1422, which may also be referred to as an EPC. The LTE CN 1422 may include MME 1424, SGW 1426, SGSN 1428, HSS 1430, PGW 1432, and PCRF 1434 coupled with one another over interfaces (or "reference points") as shown. Functions of the elements of the LTE CN 1422 may be briefly introduced as follows.

The MME 1424 may implement mobility management functions to track a current location of the UE 1402 to facilitate paging, bearer activation/deactivation, handovers, gateway selection, authentication, etc.

The SGW 1426 may terminate an SI interface toward the RAN and route data packets between the RAN and the LTE CN 1422. The SGW 1426 may be a local mobility anchor point for inter-RAN node handovers and also may provide an anchor for inter-3GPP mobility. Other responsibilities may include lawful intercept, charging, and some policy enforcement.

The SGSN 1428 may track a location of the UE 1402 and perform security functions and access control. In addition, the SGSN 1428 may perform inter-EPC node signaling for mobility between different RAT networks; PDN and S-GW selection as specified by MME 1424; MME selection for handovers; etc. The S3 reference point between the MME 1424 and the SGSN 1428 may enable user and bearer information exchange for inter-3GPP access network mobility in idle/active states.

The HSS 1430 may include a database for network users, including subscription-related information to support the network entities' handling of communication sessions. The HSS 1430 can provide support for routing/roaming, authentication, authorization, naming/addressing resolution, location dependencies, etc. An S6a reference point between the HSS 1430 and the MME 1424 may enable transfer of subscription and authentication data for authenticating/authorizing user access to the LTE CN 1420.

The PGW 1432 may terminate an SGi interface toward a data network (DN) 1436 that may include an application/content server 1438. The PGW 1432 may route data packets between the LTE CN 1422 and the data network 1436. The PGW 1432 may be coupled with the SGW 1426 by an S5 reference point to facilitate user plane tunneling and tunnel management. The PGW 1432 may further include a node for policy enforcement and charging data collection (for example, PCEF). Additionally, the SGi reference point between the PGW 1432 and the data network 1436 may be an operator external public, a private PDN, or an intra-operator packet data network, for example, for provision of IMS services. The PGW 1432 may be coupled with a PCRF 1434 via a Gx reference point.

The PCRF 1434 is the policy and charging control element of the LTE CN 1422. The PCRF 1434 may be communicatively coupled to the app/content server 1438 to determine appropriate QoS and charging parameters for service flows. The PCRF 1432 may provision associated rules into a PCEF (via Gx reference point) with appropriate TFT and QCI.

In some embodiments, the CN 1420 may be a 5GC 1440. The 5GC 1440 may include an AUSF 1442, AMF 1444, SMF 1446, UPF 1448, NSSF 1450, NEF 1452, NRF 1454, PCF 1456, UDM 1458, and AF 1460 coupled with one another over interfaces (or "reference points") as shown. Functions of the elements of the 5GC 1440 may be briefly introduced as follows.

The AUSF 1442 may store data for authentication of UE 1402 and handle authentication-related functionality. The AUSF 1442 may facilitate a common authentication framework for various access types. In addition to communicating with other elements of the 5GC 1440 over reference points as shown, the AUSF 1442 may exhibit an Nausf service-based interface.

The AMF 1444 may allow other functions of the 5GC 1440 to communicate with the UE 1402 and the RAN 1404 and to subscribe to notifications about mobility events with respect to the UE 1402. The AMF 1444 may be responsible for registration management (for example, for registering UE 1402), connection management, reachability management, mobility management, lawful interception of AMF-related events, and access authentication and authorization. The AMF 1444 may provide transport for SM messages between the UE 1402 and the SMF 1446, and act as a transparent proxy for routing SM messages. AMF 1444 may also provide transport for SMS messages between UE 1402 and an SMSF. AMF 1444 may interact with the AUSF 1442 and the UE 1402 to perform various security anchor and context management functions. Furthermore, AMF 1444 may be a termination point of a RAN CP interface, which may include or be an N2 reference point between the RAN 1404 and the AMF 1444; and the AMF 1444 may be a termination point of NAS (N1) signaling, and perform NAS ciphering and integrity protection. AMF 1444 may also support NAS signaling with the UE 1402 over an N3 IWF interface.

The SMF 1446 may be responsible for SM (for example, session establishment, tunnel management between UPF 1448 and AN 1408); UE IP address allocation and management (including optional authorization); selection and control of UP function; configuring traffic steering at UPF 1448 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1444 over N2 to AN 1408; and determining SSC mode of a session. SM may refer to management of a PDU session, and a PDU session or "session" may refer to a PDU connectivity service that provides or enables the exchange of PDUs between the UE 1402 and the data network 1436.

The UPF 1448 may act as an anchor point for intra-RAT and inter-RAT mobility, an external PDU session point of interconnect to data network 1436, and a branching point to support multi-homed PDU session. The UPF 1448 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1448 may include an uplink classifier to support routing traffic flows to a data network.

The NSSF 1450 may select a set of network slice instances serving the UE 1402. The NSSF 1450 may also determine allowed NSSAI and the mapping to the subscribed S-NSSAIs, if needed. The NSSF 1450 may also determine the AMF set to be used to serve the UE 1402, or a list of candidate AMFs based on a suitable configuration and possibly by querying the NRF 1454. The selection of a set of network slice instances for the UF 1402 may be triggered by the AMF 1444 with which the UE 1402 is registered by interacting with the NSSF 1450, which may lead to a change of AMF. The NSSF 1450 may interact with the AMF 1444 via an N22 reference point; and may communicate with another NSSF in a visited network via an N31 reference point (not shown). Additionally, the NSSF 1450 may exhibit an Nnssf service-based interface.

The NEF 1452 may securely expose services and capabilities provided by 3GPP network functions for third party, internal exposure/re-exposure, AFs (e.g., AF 1460), edge computing or fog computing systems, etc. In such embodiments, the NEF 1452 may authenticate, authorize, or throttle the AFs. NEF 1452 may also translate information exchanged with the AF 1460 and information exchanged with internal network functions. For example, the NEF 1452 may translate between an AF-Service-Identifier and an internal 5GC information. NEF 1452 may also receive information from other NFs based on exposed capabilities of other NFs. This information may be stored at the NEF 1452 as structured data, or at a data storage NF using standardized interfaces. The stored information can then be re-exposed by the NEF 1452 to other NFs and AFs, or used for other purposes such as analytics. Additionally, the NEF 1452 may exhibit an Nnef service-based interface.

The NRF 1454 may support service discovery functions, receive NF discovery requests from NF instances, and provide the information of the discovered NF instances to the NF instances. NRF 1454 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1454 may exhibit the Nnrf service-based interface.

The PCF 1456 may provide policy rules to control plane functions to enforce them, and may also support unified policy framework to govern network behavior. The PCF 1456 may also implement a front end to access subscription information relevant for policy decisions in a UDR of the UDM 1458. In addition to communicating with functions over reference points as shown, the PCF 1456 exhibit an Npcf service-based interface.

The UDM 1458 may handle subscription-related information to support the network entities' handling of communication sessions, and may store subscription data of UE 1402. For example, subscription data may be communicated via an N8 reference point between the UDM 1458 and the AMF 1444. The UDM 1458 may include two parts, an application front end and a UDR. The UDR may store subscription data and policy data for the UDM 1458 and the PCF 1456, and/or structured data for exposure and application data (including PFDs for application detection, application request information for multiple UEs 1402) for the NEF 1452. The Nudr service-based interface may be exhibited by the UDR 221 to allow the UDM 1458, PCF 1456, and NEF 1452 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1458 may exhibit the Nudm service-based interface.

The AF 1460 may provide application influence on traffic routing, provide access to NEF, and interact with the policy framework for policy control.

In some embodiments, the 5GC 1440 may enable edge computing by selecting operator/3$^{rd}$ party services to be geographically close to a point that the UE 1402 is attached to the network. This may reduce latency and load on the network. To provide edge-computing implementations, the 5GC 1440 may select a UPF 1448 close to the UE 1402 and execute traffic steering from the UPF 1448 to data network 1436 via the N6 interface. This may be based on the UE subscription data, UE location, and information provided by the AF 1460. In this way, the AF 1460 may influence UPF (re)selection and traffic routing. Based on operator deployment, when AF 1460 is considered to be a trusted entity, the network operator may permit AF 1460 to interact directly with relevant NFs. Additionally, the AF 1460 may exhibit an Naf service-based interface.

The data network 1436 may represent various network operator services, Internet access, or third party services that may be provided by one or more servers including, for example, application/content server 1438.

FIG. 15 schematically illustrates a wireless network 1500 in accordance with various embodiments. The wireless network 1500 may include a UE 1502 in wireless communication with an AN 1504. The UE 1502 and AN 1504 may be similar to, and substantially interchangeable with, like-named components described elsewhere herein.

The UE 1502 may be communicatively coupled with the AN 1504 via connection 1506. The connection 1506 is illustrated as an air interface to enable communicative coupling, and can be consistent with cellular communications protocols such as an LTE protocol or a 5G NR protocol operating at mmWave or sub-6 GHZ frequencies.

The UE 1502 may include a host platform 1508 coupled with a modem platform 1510. The host platform 1508 may include application processing circuitry 1512, which may be coupled with protocol processing circuitry 1514 of the modem platform 1510. The application processing circuitry 1512 may run various applications for the UF 1502 that source/sink application data. The application processing circuitry 1512 may further implement one or more layer operations to transmit/receive application data to/from a data network. These layer operations may include transport (for example UDP) and Internet (for example, IP) operations The protocol processing circuitry 1514 may implement one or more of layer operations to facilitate transmission or reception of data over the connection 1506. The layer operations implemented by the protocol processing circuitry 1514 may include, for example, MAC, RLC, PDCP, RRC and NAS operations.

The modem platform 1510 may further include digital baseband circuitry 1516 that may implement one or more layer operations that are "below" layer operations performed by the protocol processing circuitry 1514 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1510 may further include transmit circuitry 1518, receive circuitry 1520, RF circuitry 1522, and RF front end (RFFE) 1524, which may include or connect to one or more antenna panels 1526. Briefly, the transmit circuitry 1518 may include a digital-to-analog converter, mixer, intermediate frequency (IF) components, etc.; the receive circuitry 1520 may include an analog-to-digital converter, mixer, IF components, etc.; the RF circuitry 1522 may include a low-noise amplifier, a power amplifier, power tracking components, etc.; RFFE 1524 may include filters (for example, surface/bulk acoustic wave filters), switches, antenna tuners, beamforming components (for example, phase-array antenna components), etc. The selection and arrangement of the components of the transmit circuitry 1518, receive circuitry 1520, RF circuitry 1522, RFFE 1524, and antenna panels 1526 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1514 may include one or more instances of control circuitry (not shown) to provide control functions for the transmit/receive components.

A UF reception may be established by and via the antenna panels 1526, RFFE 1524, RF circuitry 1522, receive circuitry 1520, digital baseband circuitry 1516, and protocol processing circuitry 1514. In some embodiments, the antenna panels 1526 may receive a transmission from the AN 1504 by receive-beamforming signals received by a plurality of antennas/antenna elements of the one or more antenna panels 1526.

A UE transmission may be established by and via the protocol processing circuitry 1514, digital baseband circuitry 1516, transmit circuitry 1518, RF circuitry 1522, RFFE 1524, and antenna panels 1526. In some embodiments, the transmit components of the UE 1504 may apply a spatial filter to the data to be transmitted to form a transmit beam emitted by the antenna elements of the antenna panels 1526.

Similar to the UE 1502, the AN 1504 may include a host platform 1528 coupled with a modem platform 1530. The host platform 1528 may include application processing circuitry 1532 coupled with protocol processing circuitry 1534 of the modem platform 1530. The modem platform may further include digital baseband circuitry 1536, transmit circuitry 1538, receive circuitry 1540, RF circuitry 1542, RFFE circuitry 1544, and antenna panels 1546. The components of the AN 1504 may be similar to and substantially interchangeable with like-named components of the UE 1502. In addition to performing data transmission/reception as described above, the components of the AN 1508 may perform various logical functions that include, for example, RNC functions such as radio bearer management, uplink and downlink dynamic radio resource management, and data packet scheduling.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640 or other interface circuitry. For embodiments where node virtualization (e.g., NFV) is utilized, a hypervisor 1602 may be executed to provide an execution environment for one or more network slices/subslices to utilize the hardware resources 1600.

The processors 1610 may include, for example, a processor 1612 and a processor 1614. The processors 1610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1620 may include main memory, disk storage, or any suitable combination thereof. The memory/storage devices 1620 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1630 may include interconnection or network interface controllers, components, or other suitable devices to communicate with one or more peripheral devices 1604 or one or more databases 1606 or other network elements via a network 1608. For example, the communication resources 1630 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1650 may comprise software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

Example Procedures

In some embodiments, the electronic device(s), network(s), system(s), chip(s) or component(s), or portions or implementations thereof, of FIGS. 14-16, or some other figure herein, may be configured to perform one or more processes, techniques, or methods as described herein, or portions thereof. One such process 1700 is depicted in FIG. 17. In some embodiments, the process 1700 may be performed by a UE or a portion thereof.

At 1702, the process 1700 may include receiving configuration information for a first set of one or more sounding reference signal (SRS) resource sets and a second set of one or more SRS resource sets, wherein the first set is associated with a first transmission-reception point (TRP) and the second set is associated with a second TRP. The configuration information may include one or more power control parameters of the respective SRS resource sets. The one or more power control parameters may include, for example, an indication of: SRS power control adjustment state, a pathloss reference signal, a P0 parameter, an alpha parameter, and/or a spatial relation.

At 1704, the process 1700 may further include receiving a message to activate one or both of the first and second set of SRS resource sets. At 1706, the process 1700 may further include transmitting one or more SRSs with antenna switching based on the activated SRS resource sets.

FIG. 18 illustrates another process 1800 in accordance with various embodiments. In some embodiments, the process 1800 may be performed by a gNB or a portion thereof. At 1802, the process 1800 may include encoding, for transmission to a user equipment (UE), configuration information for a first set of one or more sounding reference signal (SRS) resource sets and a second set of one or more SRS resource sets, wherein the first set is associated with a first transmission-reception point (TRP) and the second set is associated with a second TRP. The configuration information may include one or more power control parameters of the respective SRS resource sets. The one or more power control parameters may include, for example, an indication of: SRS power control adjustment state, a pathloss reference signal, a P0 parameter, an alpha parameter, and/or a spatial relation.

At 1804, the process 1800 may further include encoding a message for transmission to the UE to activate one or both of the first and second set of SRS resource sets for antenna switching.

FIG. 19 illustrates another process 1900 in accordance with various embodiments. In some embodiments, the process 1900 may be performed by a gNB or a portion thereof. At 1902, the process 1900 may include encoding, for transmission to a user equipment (UE), configuration information for a plurality of sounding reference signal (SRS) resource sets associated with a transmission-reception point (TRP) and configured for antenna switching, wherein all SRS resources of the plurality of SRS resource sets have a same transmission configuration indicator (TCI) state. The TCI state may be a joint uplink (UL)/downlink (DL) TCI state or a separate UL TCI state. At 1904, the process 1900 may further include receiving, from the UE, one or more SRSs with antenna switching based on the configuration information.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include the TRP, wherein it can configure the UE with SRS for antenna switching and carrier switching.

Example A2 may include the method of example A1 or some other example herein, wherein the TRP can work with single TRP or multi-TRP mode.

Example A3 may include the method of example A2 or some other example herein, wherein for multi-TRP operation, the number of aperiodic SRS resource sets for antenna switching should be extended. If the number of aperiodic SRS resource sets for antenna switching in single TRP is M, then in multi-TRP operation of two TRPs, two groups of aperiodic SRS resource sets should be configured for antenna switching. Each group contains M aperiodic SRS resource sets, e.g. the total number of aperiodic SRS resource sets in multi-TRP is 2*M. In the first group, the power control parameters of the M aperiodic SRS resource sets are associated with the 1st TRP. In the second group, the power control parameters of the M aperiodic SRS resource sets are associated with the 2nd TRP. The power control parameters may include one or several or all of the following parameters: SRS power control adjustment state, pathloss reference signal, P0, alpha, spatial relation.

Example A4 may include the method of example A2 or some other example herein, wherein for multi-TRP operation, the number of periodic/semi-persistent SRS resource sets for antenna switching should be extended. If the number of periodic/semi-persistent SRS resource sets for antenna switching in single TRP is N, then in multi-TRP operation of two TRPs, two groups of periodic/semi-persistent SRS resource sets should be configured for antenna switching. Each group contains N periodic/semi-persistent SRS resource sets, e.g. the total number of periodic/semi-persistent SRS resource sets in multi-TRP is 2*N. In the first group, the power control parameters of the N periodic/semi-persistent SRS resource sets are associated with the 1st TRP. In the second group, the power control parameters of the N periodic/semi-persistent SRS resource sets are associated with the 2nd TRP. The power control parameters may include one or several or all of the following parameters: SRS power control adjustment state, pathloss reference signal, P0, alpha, spatial relation.

Example A5 may include the method of example A2 or some other example herein, wherein for multi-TRP operation, the maximum number of SRS resource sets that can be configured to one UE may be extended, for example to 32 or 64 (max NrofSRS-ResourceSets INTEGER::=32 or maxNrofSRS-ResourceSets INTEGER::=64). The number of trigger states for aperiodic SRS and the field length for SRS Request in DCI may also be extended to support flexible triggering.

Example A6 may include the method of example A2 or some other example herein, wherein for multi-TRP operation, the number of aperiodic SRS resource sets for antenna switching may be maintained the same as single TRP operation. The power control parameters for the aperiodic SRS resource sets may be changed by the triggering DCI, e.g. the TRP specific power control parameters may be dynamically indicated by DCI triggering aperiodic SRS. A list of SRS power control parameter sets may be configured by RRC, and the DCI triggering aperiodic SRS may indicate which set will be applied for the triggered SRS. A new field should be added to the DCI that can trigger aperiodic SRS. The power control parameters may include one or several or all of the following parameters: SRS power control adjustment state, pathloss reference signal, P0, alpha, spatial relation.

Example A7 may include the method of example A2 or some other example herein, wherein for FR1 (frequency range 1), the same number of aperiodic SRS resource sets as single TRP may be maintained for multi-TRP operation since there is no UE side beamforming. The SRS resource sets are configured with power control parameters associated with TRP #A. If the network would like to perform antenna switching over TRP #B, then the power of the SRS may be boosted, (for example, SRS is transmitted with the maximum power), and TRP B can receive the SRS for antenna switching.

Example A8 may include the method of example A2 or some other example herein, wherein one or several additional aperiodic/semi-persistent/periodic SRS resource sets may be configured for SRS carrier switching. The aperiodic/semi-persistent/periodic SRS resource sets may be configured with usage set to 'antennaSwitching' and SRS power control state set to 'separateClosedLoop'. In one example, if the number of aperiodic SRS resource sets for antenna switching is M, then additional M aperiodic SRS resource sets may be defined for carrier switching.

Example A9 may include the method of example A2 or some other example herein, wherein no additional SRS resource set is introduced dedicatedly for carrier switching. A new field may be introduced into DCI to dynamically change the SRS power control state. For carrier switching, the field should indicate a separate power control state as PUSCH.

Example A10 may include the method of example A2 or some other example herein, wherein for carrier switching, the power control state of the aperiodic SRS resource set may be implicitly indicated by the DCI format. If the aperiodic SRS resource set with usage set to 'antennaSwitching' is triggered by DCI format 2_3, then the power control state of the SRS resource set will be implicitly changed to be separate power control state as PUSCH.

Example A11 includes a method comprising:

determining sounding reference signal (SRS) configuration information for antenna switching and carrier switching associated with a user equipment (UE), the SRS configuration information including an indication of a number of aperiodic SRS resource sets for antenna switching and one or more power control parameters of an aperiodic SRS resource set, wherein the one or more power control parameters include an indication of: an SRS power control adjustment state, a pathloss reference signal, a P0 parameter, an alpha parameter, or a spatial relation; and encoding a message for transmission to the UE that includes the SRS configuration information.

Example A12 includes the method of example A11 or some other example herein, further comprising performing a 2T8R antenna switching procedure in conjunction with the UE performing a 2T4R antenna switching procedure.

Example A13 includes the method of example A11 or some other example herein, wherein the SRS configuration information is determined based on resource sets associated with antenna switching for one or more transmission reception points (TRPs).

Example A14 includes the method of example A11 or some other example herein, wherein the SRS configuration information is determined based on an antenna switching capability of the UE.

Example A15 includes the method of example A11 or some other example herein, wherein the SRS configuration information includes an indication of periodic or semi-persistent SRS resources in different periodic or semi-persistent resource sets associated with one or more TRPs.

Example A16 includes the method of example A11 or some other example herein, wherein the SRS configuration information includes an indication of periodic or semi-persistent SRS resources in periodic or semi-persistent resource sets associated with a common TRP and that are configured with a common periodicity and different slot offset.

Example A17 includes the method of example A11 or some other example herein, wherein the SRS configuration information includes an indication of a number of periodic or semi-persistent SRS resources sets configured for a single TRP.

Example A18 includes the method of example A11 or some other example herein, wherein the SRS configuration information includes an indication of multiple SRS resources targeting different TRPs within a periodic or semi-persistent SRS resource set for a sequential transmission or interlaced transmission.

Example A19 includes the method of example A11 or some other example herein, wherein the SRS configuration information includes an indication of a TCI state associated with the one or more power control parameters.

Example A20 includes the method of example A11 or some other example herein, wherein the SRS configuration information includes an indication of a first antenna switching process for a first TRP and a second antenna switching process for a second TRP.

Example A21 includes the method of example A11 or some other example herein, wherein different groups of aperiodic SRS resource sets are configured with different trigger states.

Example A22 includes the method of example A21 or some other example herein, wherein a first group of aperiodic SRS resource sets is configured with a first trigger state, and a second group of aperiodic SRS resource sets is configured with second trigger state.

Example A23 includes the method of example A11 or some other example herein, wherein different groups of aperiodic SRS resource sets are configured with a common trigger state.

Example A24 includes the method of example A11 or some other example herein, wherein the SRS configuration information includes multiple xTyR configurations and multiple periodic/semi-persistent SRS resource sets for antenna switching, wherein x=1, 2, or 4, y=1, 2, or 4, and wherein x<=y.

Example A25 includes the method of example 24 or some other example herein, wherein the UE supports 2T4R, and the SRS configuration information is to configure the UE with a periodic or semi-persistent SRS resource set for both 1T4R and 2T4R at the same time.

Example A26 includes the method of example A11 or some other example herein, further comprising encoding a medium access control-control element (MAC-CE) message for transmission to the UE to update or re-configure a number of antenna ports for SRS resources within one or more semi-persistent or aperiodic SRS resource sets.

Example A27 includes the method of example A26 or some other example herein, wherein the MAC-CE message is to reconfigure a 2T4R antenna switching wherein one SRS resource set includes two SRS resources and each SRS resource has two ports, and the MAC-CE is to reconfigure the two SRS resources to be one port to be used as 1T2R.

Example A28 includes the method of example A26 or some other example herein, wherein the MAC-CE message is to activate or deactivate an SRS resource in one or more SRS resource sets.

Example A29 includes the method of example A11 or some other example herein, further comprising receiving a report from the UE indicating an xTyR configuration the UE wishes to perform.

Example A30 includes the method of example A29 or some other example herein, wherein the report is received on a periodic, semi-persistent, or aperiodic basis.

Example B1 may include the gNB, wherein the gNB may configure the UE to transmit SRS for antenna switching.

Example B2 may include the method of example B1 or some other example herein, wherein for SRS with antenna switching performed by the same TRP, all the SRS resources contained in all the aperiodic SRS resource sets triggered by the same DCI should be configured with the same beam (it may also be applied for single TRP operation). For SRS with antenna switching performed by different TRP, different beam may be applied for SRS toward different TRP. The beam may be configured by RRC, or updated by MAC-CE, or indicated by DCI. For SRS with antenna switching performed by the same TRP, all the aperiodic SRS resource sets triggered by the same DCI should be configured with the same value for the following parameters: alpha, p0, path-lossReferenceRS, srs-PowerControlAdjustmentState (it may also be applied for single TRP operation). For SRS with antenna switching performed by different TRP, different value of the parameters may be applied for SRS resource sets toward different TRP. The parameters (alpha, p0, path-lossReferenceRS, srs-PowerControl AdjustmentState) may be configured by RRC, or updated by MAC-CE, or indicated by DCI. In another example, the pathlossReferenceRS may be derived from the joint DL/UL TCI state or the separate UL TCI state. In another example, for SRS with antenna switching performed by the same TRP, all the SRS resources contained in one aperiodic SRS resource set should be configured with the same beam (it may also be applied for single TRP operation), wherein the beam may be configured by RRC, or updated by MAC-CE, or indicated by DCI. For SRS with antenna switching performed by different TRP, different beam may be applied for SRS resource set toward different TRP.

Example B3 may include the method of example B2 or some other example herein, wherein the MAC-CE to update pathloss reference signal for SRS may be updated for accommodate multiple SRS resource sets, in order to reduce the signaling. The SRS resource set(s) in the MAC-CE may be configured with the same or different usage (codebook, non-codebook, antennaSwitching, beamManagement). And the SRS resource set may be periodic, semi-persistent, or aperiodic.

Example B4 may include the method of example B2 or some other example herein, wherein the MAC-CF to update spatial relation for SRS may be defined to accommodate multiple SRS resource sets. The SRS resource set(s) in the MAC-CE may be configured with the same or different usage (codebook, non-codebook, antennaSwitching, beam-Management). And the SRS resource set may be periodic, semi-persistent, or aperiodic.

Example B5 may include the method of example B1 or some other example herein, wherein if multiple aperiodic SRS resource sets are triggered for antenna switching toward different TRP by the same DCI, then the multiple SRS resource sets are expected to be transmitted in sequential manner to avoid frequent beam change, e.g. after transmitting all the SRS resource sets to the 1st TRP, the UE begins to transmit the SRS resource sets to the 2nd TRP. Or the UE may be configured with interlaced transmission for multiple aperiodic SRS resource sets in multi-TRP.

Example B6 may include the method of example B1 or some other example herein, wherein if TCI state is used for uplink beam indication in multi-TRP, multiple TCI states should be indicated to the UE (or one TCI state corresponds to two beams, one from each TRP). The TCI state may be associated with different TRP implicitly or explicitly. When transmitting SRS (including periodic, semi-persistent, aperiodic), the applied TCI state may be determined by the TRP associated with the SRS resource set, for example, via the SRS power control adjustment state.

Example B7 may include the method of example B1 or some other example herein, wherein for SRS antenna switching in the scenario of multi-TRP, the UE is not expected to be triggered with antenna switching toward different TRPs by the same DCI. E.g. one DCI can only trigger the antenna switching toward one TRP.

Example B8 may include the method of example B1 or some other example herein, wherein if the legacy spatial relation is applied for SRS with antenna switching, then the same spatial relation should be applied for all the SRS resources contained in all the SRS resource sets toward the same TRP (it may also be applied for single TRP operation). If SRS antenna switching is performed among different TRP, different spatial relation may be applied for SRS transmitted to different TRP.

Example B9 may include the method of example B1 or some other example herein, wherein for SRS with antenna switching, if multiple SRS resource sets are triggered toward the same TRP, during the time period $\Delta T$ from the transmission of the first SRS resource set until the last SRS resource set, the following options may be applied (this embodiment may also be applied for single TRP operation):

During the period of $\Delta T$, the UE is not expected to receive MAC-CE updating spatial relation/pathloss reference RS toward the same TRP. And/or a previously received MAC-CE updating spatial relation/pathloss reference RS toward the same TRP is not expected to become valid during the time period of $\Delta T$.

During the period of $\Delta T$, the UE may receive MAC-CE updating spatial relation/pathloss reference RS toward the same TRP, but the spatial relation/pathloss reference RS will not become valid during the time period of $\Delta T$ (the time is not enough for the application of the MAC-CE), therefore the indicated TCI is not used for the rest SRS.

During the period of $\Delta T$, the UE may receive MAC-CE updating spatial relation/pathloss reference RS toward the same TRP or a previously received MAC-CE updating spatial relation/pathloss reference RS toward the same TRP becomes valid, but it will be discarded by the UE.

During the period of $\Delta T$, the UE may receive MAC-CE updating spatial relation/pathloss reference RS toward the same TRP or a previously received MAC-CE updating spatial relation/pathloss reference RS toward the same TRP becomes valid, but the spatial relation/pathloss reference RS is not applied for the transmission of the rest SRS resources.

During the period of $\Delta T$, the UE may receive MAC-CE updating spatial relation/pathloss reference RS toward the same TRP or a previously received MAC-CE updating spatial relation/pathloss reference RS toward the same TRP becomes valid, then the spatial relation/pathloss reference RS may be applied for the transmission of the rest SRS resources.

Example B10 may include the method of example B1 or some other example herein, wherein for aperiodic SRS with antenna switching, prior to the transmission of the first SRS resource, if the UE receives MAC-CE updating spatial relation/pathloss reference RS and the MAC-CE application time is enough before the SRS transmission, then the updated spatial relation/pathloss reference RS may be applied for the SRS transmission.

Example B11 may include the method of example B1 or some other example herein, wherein if joint DL/UL TCI state may be applied for SRS with antenna switching, then the same joint DL/UL TCI state should be applied for all the SRS resources contained in all the SRS resource sets toward the same TRP (it may also be applied for single TRP operation). If SRS antenna switching is performed among different TRP, different joint DL/UL TCI state may be applied for SRS transmitted to different TRP.

Example B12 may include the method of example B1 or some other example herein, wherein for SRS with antenna switching, if multiple SRS resource sets are triggered toward the same TRP, during the time period ΔT from the transmission of the first SRS resource set until the last SRS resource set, the following options may be applied (this embodiment may also be applied for single TRP operation):

During the period of ΔT, the UE is not expected to receive DCI indicating another joint DL/UL TCI state toward the same TRP, as shown in FIG. 13. And/or a previously indicated joint DL/UL TCI state toward the same TRP is not expected to become valid during the time period of ΔT.

During the period of ΔT, the UE may receive DCI indicating another joint DL/UL TCI state toward the same TRP, but the joint DL/UL TCI state will not become valid during the time period of ΔT (the time is not enough for the application of the indicated TCI state), therefore the indicated TCI is not used for the rest SRS.

During the period of ΔT, the UE may receive DCI indicating another joint DL/UL TCI state toward the same TRP or a previously indicated joint DL/UL TCI state toward the same TRP becomes valid, but it will be discarded by the UE.

During the period of ΔT, the UE may receive DCI indicating another joint DL/UL TCI state toward the same TRP or a previously indicated joint DL/UL TCI state toward the same TRP becomes valid, but the joint TCI state is not applied for the transmission of the rest SRS resources.

During the period of ΔT, the UE may receive DCI indicating another joint DL/UL TCI state toward the same TRP or a previously indicated joint DL/UL TCI state toward the same TRP becomes valid, then the joint TCI state may be applied for the transmission of the rest SRS resources.

Example B13 may include the method of example B1 or some other example herein, wherein for aperiodic SRS with antenna switching, prior to the transmission of the first SRS resource, if the UE receives joint DL/UL TCI state and the beam application time is enough for UE beam switching/panel switching, then the joint TCI state may be applied for the SRS transmission.

Example B14 may include the method of example B1 or some other example herein, wherein the UE is not expected to perform antenna switching if separate DL/UL TCI state is used. SRS antenna switching is applicable for the UE if joint DL/UL TCI state is used. The SRS for antenna switching includes aperiodic SRS, semi-persistent SRS and periodic SRS.

Example B15 may include the method of example B1 or some other example herein, wherein if the UE is configured with separate DL/UL TCI state, the UE may perform antenna switching. The SRS for antenna switching will be transmitted using the separate DL TCI state. The SRS for antenna switching includes aperiodic SRS, semi-persistent SRS and periodic SRS.

Example B16 is a method for implementing a gNB, the method comprising:

generating, by the gNB, a signal to send to a UE to configure beam information for the UE to transmit SRS with antenna switching; and transmitting, by the gNB to the UE, the signal.

Example B17 may include the subject matter of example B16, or of any other example herein, further comprising receiving, by the gNB from the UE, a confirmation of the transmitted signal.

Example B18 may include the subject matter of example B16, or of any other example herein, wherein the SRS includes a selected one of: aperiodic SRS, semi-persistent SRS, or periodic SRS.

Example B19 may include the subject matter example B16, or of any other example herein, wherein a beam is configured by a RRC.

Example B20 may include the subject matter of example B16, or of any other example herein, wherein a beam is updated by MAC-CE.

Example B21 may include the subject matter of example B16, or of any other example herein, wherein a beam is indicated by DCI.

Example B22 may include the subject matter of example B21, or of any other example herein, wherein a aperiodic SRS resource is triggered by the DCI.

Example B23 may include the subject matter of example B16, or of any other example herein, wherein the antenna switching is performed by a TRP.

Example C1 may include one or more non-transitory computer-readable media (NTCRM) having instructions, stored thereon, that when executed by one or more processors cause a user equipment (UE) to: receive configuration information for a first set of one or more sounding reference signal (SRS) resource sets and a second set of one or more SRS resource sets, wherein the first set is associated with a first transmission-reception point (TRP) and the second set is associated with a second TRP; receive a message to activate one or both of the first and second set of SRS resource sets; and transmit one or more SRSs with antenna switching based on the activated SRS resource sets.

Example C2 may include the one or more NTCRM of example C1, wherein the SRS resource sets of the first and second sets of SRS resource sets are semi-persistent SRS resource sets.

Example C3 may include the one or more NTCRM of example C2, wherein the message is a medium access control (MAC) control element (CE) or a downlink control information (DCI).

Example C4 may include the one or more NTCRM of example C1, wherein the configuration information includes one or more power control parameters associated with the respective SRS resource sets of the first and second sets of SRS resource sets.

Example C5 may include the one or more NTCRM of example C4, wherein the one or more power control parameters include one or more of: an SRS power control adjustment state, a pathloss reference signal, a P0 parameter, an alpha parameter, or a spatial relation.

Example C6 may include the one or more NTCRM of example C1, wherein the SRS resource sets of at least one of the first or second sets have SRS resource sets with different xTyR configurations.

Example C7 may include the one or more NTCRM of example C6, wherein the SRS resource sets with different xTyR configurations have different trigger states.

Example C8 may include the one or more NTCRM of example C1, wherein the instructions, when executed, are further to cause the UE to receive a medium access control (MAC) control element (CE) to reconfigure SRS resources of at least one of the SRS resource sets for a different xTyR configuration.

Example C9 may include the one or more NTCRM of any one of examples C1 to C8, wherein the configuration information is further to configure a third set of SRS resource sets for carrier switching, wherein the SRS resource sets of the third set of SRS resource sets are configured with a usage set to 'antennaSwitching' and a SRS power control state set to 'separateClosedLoop.'

Example C10 may include one or more non-transitory computer-readable media (NTCRM) having instructions, stored thereon, that when executed by one or more processors cause a next generation NodeB (gNB) to: encode, for transmission to a user equipment (UE), configuration information for a first set of one or more sounding reference signal (SRS) resource sets and a second set of one or more SRS resource sets, wherein the first set is associated with a first transmission-reception point (TRP) and the second set is associated with a second TRP; and encode a message for transmission to the UE to activate one or both of the first and second set of SRS resource sets for antenna switching.

Example C11 may include the one or more NTCRM of example C10, wherein the SRS resource sets of the first and second sets of SRS resource sets are semi-persistent SRS resource sets.

Example C12 may include the one or more NTCRM of example C11, wherein the message is a medium access control (MAC) control element (CE) or a downlink control information (DCI).

Example C13 may include the one or more NTCRM of example C10, wherein the configuration information includes one or more power control parameters associated with the respective SRS resource sets of the first and second sets of SRS resource sets.

Example C14 may include the one or more NTCRM of example C13, wherein the one or more power control parameters include one or more of: an SRS power control adjustment state, a pathloss reference signal, a P0 parameter, an alpha parameter, or a spatial relation.

Example C15 may include the one or more NTCRM of example C10, wherein the SRS resource sets of at least one of the first or second sets have SRS resource sets with different xTyR configurations.

Example C16 may include the one or more NTCRM of example C15, wherein the SRS resource sets with different xTyR configurations have different trigger states.

Example C17 may include the one or more NTCRM of any one of examples C10 to C16, wherein the instructions, when executed, are further to cause the gNB to transmit a medium access control (MAC) control element (CE) to reconfigure SRS resources of at least one of the SRS resource sets for a different xTyR configuration.

Example C18 may include the one or more NTCRM of any one of examples C10 to C16, wherein the instructions, when executed, are further to cause the gNB to transmit a downlink control information (DCI) with a field to dynamically indicate an SRS power control state or a DCI format to indicate the SRS power control state.

Example C19 may include one or more non-transitory computer-readable media (NTCRM) having instructions, stored thereon, that when executed by one or more processors cause a next generation Node B (gNB) to: encode, for transmission to a user equipment (UE), configuration information for a plurality of sounding reference signal (SRS) resource sets associated with a transmission-reception point (TRP) and configured for antenna switching, wherein all SRS resources of the plurality of SRS resource sets have a same transmission configuration indicator (TCI) state; and receive, from the UE, one or more SRSs with antenna switching based on the configuration information.

Example C20 may include the one or more NTCRM of example C19, wherein the TCI state is a joint downlink (DL)/uplink (UL) TCI state.

Example C21 may include the one or more NTCRM of example C19, wherein the TCI state is a separate uplink (UL) TCI state.

Example C22 may include the one or more NTCRM of example C19, wherein the instructions, when executed, are further to cause the gNB to determine that, during a time period that encompasses all SRS resources of all the SRS resource sets, the gNB is not to transmit a downlink control information (DCI) to indicate another TCI state associated with the TRP.

Example C23 may include the one or more NTCRM of example C19, wherein the TCI state is a first TCI state, and wherein the instructions, when executed, are further to cause the gNB to, during a time period that encompasses all SRS resources of all the SRS resource sets, transmit a downlink control information (DCI) to indicate a second TCI state associated with the TRP.

Example C24 may include the one or more NTCRM of example C23, wherein: the second TCI state is not to be valid until after the time period and is not to be used by the UE to transmit any remaining SRSs during the time period; the second TCI state is discarded by the UE; the second TCI state becomes valid during the time period but is not to be applied by the UE for any remaining SRSs during the time period; or the second TCI state becomes valid and is to be applied by the UE for any remaining SRSs during the time period.

Example C25 may include the one or more NTCRM of any one of examples C19 to C24, wherein the TCI state is a first TCI state and wherein the instructions, when executed, are further to cause the gNB to transmit a downlink control information (DCI) to indicate a second TCI state associated with the TRP, wherein the second TCI state is to be applied by the UE for the one or more SRSs if a time period between when the UE receives the DCI and an earliest SRS resource of the plurality of SRS resource sets is less than a beam application time.

Example Z01 may include an apparatus comprising means to perform one or more elements of a method described in or related to any of examples A1-A30, B1-B23, C1-C25, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A30, B1-B23, C1-C25, or any other method or process described herein.

Example Z03 may include an apparatus comprising logic, modules, or circuitry to perform one or more elements of a method described in or related to any of examples A1-A30, B1-B23, C1-C25, or any other method or process described herein.

Example Z04 may include a method, technique, or process as described in or related to any of examples A1-A30, B1-B23, C1-C25, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A30, B1-B23, C1-C25, or portions thereof.

Example Z06 may include a signal as described in or related to any of examples A1-A30, B1-B23, C1-C25, or portions or parts thereof.

Example Z07 may include a datagram, packet, frame, segment, protocol data unit (PDU), or message as described in or related to any of examples A1-A30, B1-B23, C1-C25, or portions or parts thereof, or otherwise described in the present disclosure.

Example Z08 may include a signal encoded with data as described in or related to any of examples A1-A30, B1-B23, C1-C25, or portions or parts thereof, or otherwise described in the present disclosure.

Example Z09 may include a signal encoded with a datagram, packet, frame, segment, protocol data unit (PDU), or message as described in or related to any of examples A1-A30, B1-B23, C1-C25, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A30, B1-B23, C1-C25, or portions thereof.

Example Z11 may include a computer program comprising instructions, wherein execution of the program by a processing element is to cause the processing element to carry out the method, techniques, or process as described in or related to any of examples A1-A30, B1-B23, C1-C25, or portions thereof.

Example Z12 may include a signal in a wireless network as shown and described herein. Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

| | | |
|---|---|---|
| 3GPP Third Generation Partnership Project | AP Application Protocol, Antenna Port, Access Point | BRAS Broadband Remote Access Server |
| 4G Fourth Generation | API Application Programming Interface | BSS Business Support System |
| 5G Fifth Generation | APN Access Point Name | BS Base Station |
| 5GC 5G Core network | ARP Allocation and Retention Priority | BSR Buffer Status Report |
| AC Application Client | ARQ Automatic Repeat Request | BW Bandwidth |
| ACK Acknowledgement | AS Access Stratum | BWP Bandwidth Part |
| ACID Application Client Identification | ASP Application Service Provider | C-RNTI Cell Radio Network Temporary Identity |
| AF Application Function | ASN.1 Abstract Syntax Notation One | CA Carrier Aggregation, Certification Authority |
| AM Acknowledged Mode | AUSF Authentication Server Function | CAPEX CAPital EXpenditure |
| AMBRAggregate Maximum Bit Rate | AWGN Additive White Gaussian Noise | CBRA Contention Based Random Access |
| AMF Access and Mobility Management Function | BAP Backhaul Adaptation Protocol | CC Component Carrier, Country Code, Cryptographic Checksum |
| AN Access Network | BCH Broadcast Channel | CCA Clear Channel Assessment |
| ANR Automatic Neighbour Relation | BER Bit Error Ratio | CCE Control Channel Element |
| CDM Content Delivery Network | BFD Beam Failure Detection | CCCH Common Control Channel |
| CDMA Code-Division Multiple Access | BLER Block Error Rate | CE Coverage Enhancement |
| CFRA Contention Free Random Access | BPSK Binary Phase Shift Keying | C-RNTI Cell RNTI |
| CG Cell Group | COTS Commercial Off-The-Shelf | CS Circuit Switched |
| CGF Charging Gateway Function | CP Control Plane, Cyclic Prefix, Connection Point | CSCF call session control function |
| CHF Charging Function | CPD Connection Point Descriptor | CSAR Cloud Service Archive |
| CI Cell Identity | CPE Customer Premise Equipment | CSI Channel-State Information |
| CID Cell-ID (e.g., positioning method) | CPICHCommon Pilot Channel | CSI-IM CSI Interference Measurement |
| CIM Common Information Model | CQI Channel Quality Indicator | CSI-RS CSI Reference Signal |
| CIR Carrier to Interference Ratio | CPU CSI processing unit, Central Processing Unit | CSI-RSRP CSI reference signal received power |
| CK Cipher Key | C/R Command/Response field bit | CSI-RSRQ CSI reference signal received quality |
| CM Connection Management, Conditional | CRAN Cloud Radio Access Network, Cloud RAN | CSI-SINR CSI signal-to-noise and interference ratio |
| | CRB Common Resource Block | CSMA Carrier Sense Multiple Access |
| | CRC Cyclic Redundancy Check | CSMA/CA CSMA with collision avoidance |
| | CRI Channel-State Information Resource | CSS Common Search Space, Cell-specific Search Space |
| | | ECSP Edge Computing Service Provider |
| | | EDN Edge Data Network |
| | | EEC Edge Enabler Client |
| | | EECID Edge Enabler Client Identification |
| | | EES Edge Enabler Server |

Mandatory
CMAS Commercial
Mobile Alert Service
CMD Command
CMS Cloud
Management System
CO Conditional
Optional
CoMP Coordinated
Multi-Point
CORESET Control
Resource Set
CTF Charging
Trigger Function
CTS Clear-to-Send
CW Codeword
CWS Contention
Window Size
D2D Device-to-
Device
DC Dual
Connectivity,
Direct Current
DCI Downlink Control
Information
DF Deployment Flavour
DL Downlink
DMTF Distributed
Management
Task Force
DPDK Data Plane
Development Kit
DM-RS, DMRS
Demodulation
Reference Signal
DN Data network
DNN Data Network
Name
DNAI Data Network
Access Identifier
DRB Data Radio
Bearer
DRS Discovery
Reference Signal
EMS Element
Management System
eNB evolved NodeB,
E-UTRAN Node B
EN-DC E-UTRA-NR
Dual Connectivity
EPC Evolved Packet Core
EPDCCH enhanced PDCCH,
enhanced Physical Downlink
Control Channel
EPRE Energy per
resource element
EPS Evolved Packet System
EREG enhanced REG, enhanced
resource element groups
ETSI European Telecommunication
Standards Institute
ETWS Earthquake and Tsunami
Warning System
eUICC embedded UICC, embedded
Universal Integrated Circuit Card
GERAN GSM EDGE RAN, GSM EDGE
Radio Access Network
GGSN Gateway GPRS Support Node
GLONASS GLObal'naya
NAvigatsionnay Sputnikovaya
Sistema (Engl.: Global
Navigation Satellite System)
gNB Next Generation NobeB
gNB-CU gNB centralized unit
Next Generation NodeB
gNB-DU gNB distributed unit
Next Generation NodeB
GNSS Global Navigation Satellite
System Indicator, CSI-RS Resource Indicator
DRX Discontinuous Reception
DSL Domain Specific Language,
Digital Subscriber Line
DSLAM DSL Access Multiplexer
DwPTS Downlink Pilot Time Slot
E-LAN Ethernet Local Area Network
E2E End-to-End
ECCA extended clear channel
assessment, extended CCA
ECCE Enhanced Control Channel
Element, Enhanced CCE
ED Energy Detection
EDGE Enhanced Datarates for
GSM Evolution (GSM Evolution)
EAS Edge Application Server
EASID Edge Application
Server Identification
ECS Edge Configuration Server
E-UTRA Evolved UTRA
E-UTRAN Evolved UTRAN
EV2X Enhanced V2X
F1AP F1 Application Protocol
F1-C F1 Control plane interface
F1-U F1 User plane interface
FACCH Fast Associated Control Channel
FACCH/F Fast Associated Control
Channel/Full rate
FACCH/H Fast Associated Control
Channel/Half rate
FACH Forward Access Channel
FAUSCH Fast Uplink Signalling Channel
FB Functional Block
FBI Feedback Information
FCC Federal Communications Commission
GSM Global System
for Mobile Communications,
Groupe Spécial Mobile
GPT GRPS Tunneling Protocol
GTP-UGPRS Tunneling
Protocol for User Plane
GTS Go To Sleep Signal
(related to WUS)
GUMMEI Globally Unique
MME Identifier
GUTI Globally Unique
Temporary UE Identity
HARQ Hybrid ARQ, Hybrid
Automatic Repeat Request
HANDO Handover
HFN HyperFrame Number
HHO Hard Handover
HLR Home Location Register
HN Home Network
HO Handover
HPLMN Home Public Land
Mobile Network
IMPI IP Multimedia Private
Identity
IMPU IP Multimedia PUblic
Indentity
IMS IP Multimedia Subsystem
IMSI International Mobile
Subscriber Identity
IoT Internet of Things
IP Internet Protocol
Ipsec IP Security, Internet
Protocol Security
IP-CAN IP-Connectivity Access Network
IP-M IP Multicase
IPv4 Internet Protocol Version 4
IPv6 Internet Protocol Version 6
IR Infrared
IS In Sync
IRP Integration Reference Point
ISDN Integrated Service Digital
Network
ISIM IM Services Identity Module
LTE Long Term Evoluation EESID Edge Enabler Server
Identification
EHE Edge Hosting Environment
EGMF Exposure Governance
Management Function
EGPRS Enhanced GRPS
EIR Equipment Identity Register
eLAA enhanced Licensed Assisted
Access, enhanced LAA
EM Element Manager
eMBB Enhanced Mobile Broadband
FCCH Frequency Correction CHannel
FDD Frequency Division Duplex
FDM Frequency Division Multiplex
FDMA Frequency Division Multiple
Access
FE Front End
FEC Forward Error Correction
FFS For Further Study
FFT Fast Fourier Transformation
feLAA further enhanced Licensed
Assisted Access, further
enhanced LAA
FN Frame Number
FPGA Field-Programmable Gate Array
FR Frequency Range
FQDN Fully Qualified Doman Name
G-RNTI GERAN Radio Network
Temporary Identity
HSDPA High Speed Downlink
Packet Access
HSN Hopping Sequence Number
HSPA High Speed Packet Access
HSS Home Subscriber Server
HSUPA High Speed Uplink Packet Access
HTTP Hyper Text Transfer Protocol
HTTPS Hyper Text Transfer Secured
(https is: http/1.1 over SSL, i.e.
port 443)
I-Block Information Block
ICCID Integrated Circuit
Card Identification
IAB Integrated Access and
Backhaul
ICIC Inter-Cell Interference
ID Identity, identifier
ISO International Organisation
for Standardisation
ISP Internet Service Provider
IWF Interworking Function
I-WLAN Interworking WLAN Contraint
length of the convolutional code,
USIM Individual key
kB Kilobye (1000 bytes)
kbps kilo-bits per second
Kc Ciphering key
Ki Individual subscriber
authentication key
KPI Key Performance Indicator
KQI Key Quality Indicator
KSI Key Set Identifier
ksps kilo-symbols per second
KVM Kernel Virtual Machine
Broadcast and Multicast Service
MBSFN Multimedia Broadcase multicast
service Single Frequency Network
MCC Mobile Country Code
MCG Mobile Cell Group
MCOTMaximum Channgel Occupancy Time
MCS Modulation and coding scheme
MDAF Management Data Analytics
Function
MDAS Management Data Analytics
Service
MDT Minimization of Drive Tests
ME Mobile Equipement
MeNB master eNB
MER Message Error Ratio
MGL Measurement Gap Length GPRS General Packet Radio Service
GPSI Generic Public Subscription
Identifier
IDFT Inverse Discrete Fourier
Transform
IE Information element
IBE In-Band Emission
IEEE Institute of Electrical
and Electronics Engineers
IEI Information Element
Identifier
IEIDL Information Element
Identifier Data Length
IETF Internet Engineering
Task Force
IF Infrastructure
IM Interference Measurement,
Intermodulation, IP Multimedia
IMC IMS Credentials
IMEI International Mobile
Equipment Identity
IMGI International mobile group
identity
L1 Layer 1 (physical layer)
L2 Layer 2 (data link layer)
L3 Layer 3 (network layer)
LAA Licensed Assisted Access
LAN Local Area Network
LADN Local Area Data Network
LBT Listen Before Talk
LCM LifeCycle Management
LCR Low Chip Rate
LCS Location Services
LCID Logical Channel ID
LI Layer Indicator
LLC Logical Link Control,
Low Layer Compatibility
LPLMN Local PLMN
LPP LTE Positioning Protocol
LSB Least Significant Bit
MGRP Measurement Gap
Repetition Period
MIB Master Information Block,
Management Information Base
MIMO Multiple Input
Multiple Output
MLC Mobile Location Centre
MM Mobility Management
MME Mobility Management
Entity
MN Master Node
MNO Mobile Network Operator
MO Measurement Object,
Mobile Originated
MPBCH MTC Physical
Broadcast CHannel
MPDCCH MTC Physical
Downlink Control CHannel
MPDSCH MTC Physical
Downlink Shared CHannel
NFV Network Functions
Virtualization
NFVI NFV Infrastructure
NFVO NFV Ofchestrator
NG Next Generation, Next Gen
NGEN-DC NG-Ran E-UTRA-NR Dual
Connectivity
NM Network Manager
NMS Network Management System
N-PoP Network Point of
Presence NMIB, N-MIB
Narrowband MIB
NPBCH Narrowband Physical
Broadcast CHannel
NDPCCH Narrowband Physical
Downlink Control CHannel
NPDSCH Narrowband Physical
Downlink Shared CHannel
PAR Peak to Average Ratio LWA LTE-WLAN aggregation
LWIP LTE/WLAN Radio Level Integration
with IPsec Tunel
LTE Long Term Evoluation
M2M Machine-to-Machine
MAC Medium Access Control
(protocol layering context)
MAC-A MAC used for authentication
and key agreement (TSG T WG3
context)
MAC-IMAC used for data integrity of
signalling messages (TSG T WG3 context)
MANO Management and Orchestration
MBMS Multimedia Access CHannel
MPUSCH MTC Physical Uplink Shared
Channel
MPLS MutiProtocol Label Switching
MS Mobile Station
MSB Most Significant Bit MSC Mobile Switching Centre
MSI Minimum System Information,
MCH Scheduling Information
MSID Mobile Station Identifier
MSIN Mobile Station Identification
Number
MSISDN Mobile Subscriber ISDN Number
MT Mobile Terminated, Mobile Termination
MTC Machine-Type Communications
mMTCmassive MTC, massive Machine-Type
NPRACH Narrowband Physical Random
Access CHannel
NPUSCH Narrowband Physical Uplink
Shared CHannel
NPSS Narrowband Primary Synchronization
Signal
NSSS Narrowband Secondary Synchronization
Signal
NR New Radio, Neighbour Relation
NRF NF Respository Function
NRS Narrowband Reference Signal
NS Network Service
NSA Non-Standalone operation mode
NSD Network Service Descriptor
NSR Network Service Road
NSSAI Network Slice Selection
Assistance Information
PDN Packet Data Network,
Public Data Network
PDSCH Physical Downlink
Shared Channel
PDU Protocol Data Unit
PEI Permanent Equipment Identifiers
PFD Packet Flow Description
P-GW PDN Gateway PHICH Physical
hybrid-ARQ indicator channel
PHY Physical layer
PLMN Public Land Mobile Network
PIN Personal Identification Number
PM Performance Measurement
PMI Precoding Matrix Indicator
PNF Physical Network Function
PNFD Physical Network
Function Descriptor
PNFR Physical Network
Function Record
RAB Radio Access Bearer,
Random Access Burst
RACH Random Access Channel
RADIUS Remote Authentication Dial
In User Service
RAN Radio Access Network
RAND RANDom number
(used for authentication)
RAR Random Access Response
RAT Radio Access Technology
RAU Routing Area Update
RB Resource block, Radio Bearer
RBG Resource block group Communications
MU-MIMO Multi User MIMO
MWUS MTC wake-up signal, MTC WUS
NACK Negative Acknowledgement
NAI Network Access Identifier
NAS Non-Access Statum, Non-
Access Stratum layer
NCT Network Connectivity Topology
NC-JT Non-Coherent Joint
Transmission
NEC Network Capability Exposure
NE-DC NR-E-UTRA Dual Connectivity
NEF Network Exposure Function
NF Network Function
NFP Network Forwarding Path
NFPD Network Forwarding Path
Descriptor
S-NNSAI Single-NSSAI
NSSF Network Slice Selection Function
NW Network
NWUS Narrowband wake-up signal,
Narrowband WUS
NZP Non-Zero Power
O&M Operation and Maintenance
ODU2 Optical channel Data Unit-
type 2
OFDM Orthogonal FrequencyDivision
Multiplexing
OFDMA Orthogonal Frequency Division
Multiple Access
OOB Out-of-band
OOS Out of Sync
OPEX OPerating EXpense
OSI Other System Information
OSS Operations Support System
OTA over-the-air
PAPR Peak-to-Average Power Ratio
POC PTT over Cellular
PP, PTP Point-to-Point
PPP Point-to-Point Protocol
PRACH Physical RACH
PRB Physical resource block
PRG Physical Resource block group
ProSe Proximity Services,
Proximity-Based Services
PRS Positioning Reference Signal
PRR Packet Reception Radio
PS Packet Service
ProSe Proximity Services,
Proximity-Based Services
PRS Positioning Reference Signal
PRR Packet Reception Radio
PS Packet Service
PSBCH Physical Sidelink Broadcast
Channel
PSDCH Physical Sidelink Downlink
Channel
PSCCH Physical Sidelink Control
Channel
PSSCH Physical Sidelink Shared
Channel
PSCell Primary SCellLink Control layer
RLC AM RLC Acknowledged Mode
RLC UM RLC Unacknowledged Mode
RLF Radio Link Failure
RLM Radio Link Monitoring
RLM-RS Reference Signal for RLM
RM Registration Management
RMC Reference Measurement Channel
RMSI Remaining MSI, Remaining
Minimum System Information
RN Relay Node
RNC Radio Network Controller
RNL Radio Network Layer
RNTI Radio Network Temporary
Identifier
ROHC RObust Header Compression
RRC Radio Resource Control, Radio
SCM Security Context Management -continued PBCH Physical Broadcast Channel
PC Power Control, Personal Computer
PCC Primary Component Carrier, Primary CC
P-CSCF Proxy CSCF
PCell Primary Cell
PCI Physical Cell ID, Physical Cell Identity
PCEF Policy and Charging Enforcement Function
PCF Policy Control Function
PCRF Policy Control and Charging Rules Function
PDCP Packet Data Convergence Protocol, Packet Data Convergence Protocol layer
PSS Primary Synchronization Signal
PSTN Public Switched Telephone Network
PT-RS Phase-tracking reference singal
PTT Push-to-Talk
PUCCH Physical Uplink Control Channel
QAM Quadrature Amplitude Modulations
QCI QoS class of location
QCL Quasi co-location
QFI QoS Flow ID, QoS Flow Identifier
QoS Quality of Service
QPSK Quadrature (Quanternary) Phase Shift Keying
QZSS Quasi-Zenith Satellite System
RA-RNTI Random Access RNTI Resource Control layer
RRM Radio Resource management
RS Reference Signal
RSRP Reference Singal Received Power
RSRQ Reference Signal Received Quality
RSSI Received Singal Strength
RSU Road Side Unit
RSTD Reference Signal Time difference
RTP Real Time Protocol
PTS Ready-to-Send
RTT Round Trip Time
Rx Reception, Receiving, Receiver
S1AP S1 Appication Protocol
S1-MME S1 for the control plane
S1-U S1 for the user plane
S-CSCF serving CSCF and frame timing difference
SFN System Frame Number
SgNB Secondary gNB
SGSN Secondary GPRS Support Node
S-GW Serving Gateway
SI System Information
SI-RNTI System Information RNTI
SIB System Information Block
SIM Subscriber Identity Module
SIP Session Initiated Protocol
SiP System in Package
SL Sidelink
SLA Service Level Agreement
SM Session Management
SMF Session Management Function
SMS Short Message Service
SMSF SMS Function
SMTC SSB-based Measurement REG Resource Element Group
Rel Release
REQ REQuest
RF Radio Frequency
RI Rank Indicator
RIV Resource indicator value
RL Radio Link
RLC Radio Link Control, Radio
S-GW Serving Gateway
S-RNTI SRNC Radio Network Temporary Identity
S-TMSI SAE Temporary Mobile Station Identifier
SA Standalone operation mode
SAE System Architecture Evolution
SAP Service Access Point
SAPD Service Access Point Descriptor
SAPI Service Access Point Identifier
SCC Secondary Component Carrier, Secondary CC SCell Secondary Cell
SCEF Service Capability Exposure Function
SC-FDMA Single Carrier Frequency Division Multiple Access
SCG Secondary Cell Group
SN Secondary Node, Sequence Number
SoC System on Chip
SON Self-Organizing Network
SpCell Special Cell
SP-CSI-RNTISemi-Persistent CSI RNTI
SPS Semi-Persistent Scheduling
SQN Sequence number
SR Scheduling Request
SRB Signalling Radio Bearer
SRS Sounding Reference Signal
SS Synchronization Signal
SSB Synchronization Signal Block
SSID Service Set Identifier
SS/PBCH Block
SSBRI SS/PBCH Block Resource Indicator, Synchronization Single Block Resource Indicator
TMSI Temporary Mobile Subscriber Identity
TNL Transport Network Layer
TPC Transmit Power Control
TPMI Transmitted Precoding Matrix Indicator
TR Technical Report
TRp, TRxP Transmission Reception Point
TRS Tracking Reference Signal
TRx Transceiver
TS Technical Specifications, Technical Standard
TTI Transmission Time Interval
Tx Transmission, Transmitting, Transmitter
U-RNTI UTRAN Radio Network Temporary Identity
UART Universal Asynchronous
VNFFG VNF Forwarding Graph
VNFFGD VNF Forwarding Graph Descriptor
VNFM VNF Manager
VoIP Voice-over-IP, Voice-over- Internet Protocol
VPLMN Visited Public Land Mobile Network
VPN Virtual Private Network
VRB Virtual Resource Block
WiMax Worldwide Interoperability for Microwave Access
WLANWireless Local Area Network
WMAN Wireless Metropolitan Area Network
WPANWireless Personal Area Network
X2-C X2-Control plane
X2-U X2-User plane
XML eXtensible Markup Language SCS Subcarrier Spacing
SCTP Stream Control Transmission Protocol
SDAP Service Data Adaptation Protocol, Service Data Adaptation Protocol layer
SDL Supplementary Downlink
SDNF Structured Data Storage Network Function
SDP Session Description Protocol
SDSF Structured Data Storage Function
SDU Service Data Unit
SEAF Security Anchor Function
SeNB secondary eNB
SEPP Security Edge Protection Proxy
SFI Slot format indication
SFTD Space-Frequency Time Diversity, SFN
SSC Session and Service Continuity
SS-RSRP Synchronization Singal based Reference Signal Received Power
SS-RSRQ Synchronization Singal based Reference Singal Received Quality
SS-SINR Synchronization Singal based Signal to Noise and Interference Ratio
SSS Secondary Synchronization Signal
SSSG Search Space Set Group
SSSIF Search Space Set Indicator
SST Slice/Service Types
SU-MIMO Single User MIMO
SUL Supplementary Uplink Receiver and Transmitter
UCI Uplink Control Information
UE User Equipment
UDM Unified Data Management
UDP User Datagram Protocol
UDSF Unstructured Data Storage Network Function
UICC Universal Integrated Circuit Card
UL Uplink
UM Unacknowledged Mode
UML Unified Modelling Language
UMTS Universal Mobile Telecommunications System
UP User Plane
UPF User Plane Fuction
URI Uniform Resource Identifier
URL Uniform Resource Locator
URLLC Ultra-Reliable and Low Latency
XRES Expected user RESponse
XOR eXclusive OR
ZC Zadoff-Chu
ZP Zero Power Timing Configuration
TA Timing Advance, Tracking Area
TAC Tracking Area Code
TAG Timing Advance Group
TAI Trancking Area Identity
TAU Tracking Area Update
TB Transport Block
TBS Transport Block Size
TBD To Be Defined
TCI Transmission Configuration
Indicator
TCP Transmission Communication
Protocol
TDD Time Division Duplex
TDM Time Division Multiplexing
TDMA Time Division Multiple
Access
TE Terminal Equipement
TFT Traffic Flow Template
USB Universal Serial Bus
USIM Universal Subscriber
Identity Module
USS UE-specific search space
UTRA UMTS Terrestrial Radio
Access
UTRAN Universal Terrestrial
Radio Access
UwPTS Uplink Pilot
Time Slot
V2I Vehicle-to-Infrastruction
V2P Vehicle-to-Pedestrian
V2V Vehicle-to-Vehicle
V2X Vehicle-to-everything
VIM Virtualized Infrastructure
Manager
VL Virtual Link,
VLAN Virtual LAN, Virtual
Local Area Network
VM Virtual Machine
VNF Virtualized Network Function Terminology For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-Measurement TimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/. The term "Special Cell" refers to the PCell of the MCG or the PSCell of the SCG for DC operation; otherwise, the term "Special Cell" refers to the Pcell.

The invention claimed is:

1. One or more non-transitory computer-readable media (NTCRM) having instructions, stored thereon, that when executed by one or more processors cause a user equipment (UE) to:

receive configuration information for a first sounding reference signal (SRS) resource set; a second SRS resource set, and a third SRS resource set, the first and second sets of SRS resource sets being semi-persistent (SP) SRS resource sets, the third SRS resource set being a periodic SRS resource set, the first, second and third SRS resource sets configured for antenna switching, wherein the configuration information includes spatial relation information for the SRS resource sets;

receive a medium access control (MAC) control element (CE) (MAC-CE) to activate one or more of the SRS resource sets; and transmit SRSs with antenna switching based on the activated one or more SRS resource sets, wherein one of the SRS resource sets is configured with an SRS power control state set to 'separateClosedLoop', and wherein one of the SRS resource sets is configured for carrier-based SRS switching.

2. One or more non-transitory computer-readable media (NTCRM) having instructions, stored thereon, that when executed by one or more processors cause a user equipment (UE) to:

receive configuration information for a first set of one or more sounding reference signal (SRS) resource sets and a second set of one or more SRS resource sets, wherein the first set is associated with a first transmission-reception point (TRP) and the second set is associated with a second TRP;

receive a message to activate one or both of the first and second set of SRS resource sets; and transmit one or more SRSs with antenna switching based on the activated SRS resource sets, wherein the configuration information is further to configure a third set of SRS resource sets for carrier switching, wherein the SRS resource sets of the third set of SRS resource sets are configured with a usage set to 'antennaSwitching' and an SRS power control state set to 'separateClosedLoop'.

3. The one or more NTCRM of claim 2, wherein the SRS resource sets of the first and second sets of SRS resource sets are semi-persistent SRS resource sets.

4. The one or more NTCRM of claim 3, wherein the message is a medium access control (MAC) control element (CE) or a downlink control information (DCI).

5. The one or more NTCRM of claim 2, wherein the configuration information includes one or more power control parameters associated with the respective SRS resource sets of the first and second sets of SRS resource sets.

6. The one or more NTCRM of claim 5, wherein the one or more power control parameters include one or more of: an SRS power control adjustment state, a pathloss reference signal, a P0 parameter, an alpha parameter, or a spatial relation.

7. The one or more NTCRM of claim 2, wherein the SRS resource sets of at least one of the first or second sets have SRS resource sets with different xTyR configurations, and wherein the SRS resource sets with different xTyR configurations have different trigger states.

8. The one or more NTCRM of claim 2, wherein the instructions, when executed, are further to cause the UE to receive a medium access control (MAC) control element (CE) to reconfigure SRS resources of at least one of the SRS resource sets for a different xTyR configuration.

9. One or more non-transitory computer-readable media (NTCRM) having instructions, stored thereon, that when executed by one or more processors cause a next generation Node B (gNB) to:

encode, for transmission to a user equipment (UE), configuration information for a plurality of sounding reference signal (SRS) resource sets associated with a transmission-reception point (TRP) and configured for antenna switching, wherein all SRS resources of the plurality of SRS resource sets have a same transmission configuration indicator (TCI) state; and receive, from the UE, one or more SRSs with antenna switching based on the configuration information, wherein the TCI state is a first TCI state, and wherein the instructions, when executed, are further to cause the gNB to, during a time period that encompasses all SRS resources of all the SRS resource sets, transmit a downlink control information (DCI) to indicate a second TCI state associated with the TRP;

wherein:

the second TCI state is not to be valid until after the time period and is not to be used by the UE to transmit any remaining SRSs during the time period;

the second TCI state is discarded by the UE;

the second TCI state becomes valid during the time period but is not to be applied by the UE for any remaining SRSs during the time period; or the second TCI state becomes valid and is to be applied by the UE for any remaining SRSs during the time period.

10. The one or more NTCRM of claim 9, wherein the TCI state is a joint downlink (DL)/uplink (UL) TCI state or a separate UL TCI state.

11. The one or more NTCRM of claim 9, wherein the instructions, when executed, are further to cause the gNB to determine that, during a time period that encompasses all SRS resources of all the SRS resource sets, the gNB is not to transmit a downlink control information (DCI) to indicate another TCI state associated with the TRP.

12. The one or more NTCRM of claim 9, wherein the TCI state is a first TCI state and wherein the instructions, when executed, are further to cause the gNB to transmit a downlink control information (DCI) to indicate a second TCI state associated with the TRP, wherein the second TCI state is to be applied by the UE for the one or more SRSs if a time period between when the UE receives the DCI and an earliest SRS resource of the plurality of SRS resource sets is less than a beam application time.

* * * * *